(12) United States Patent
Hiramatsu

(10) Patent No.: US 10,895,210 B1
(45) Date of Patent: Jan. 19, 2021

(54) ENGINE DRIVE SYSTEM

(71) Applicant: MAHLE ELECTRIC DRIVES JAPAN CORPORATION, Numazu (JP)

(72) Inventor: Kei Hiramatsu, Numazu (JP)

(73) Assignee: MAHLE ELECTRIC DRIVES JAPAN CORPORATION, Shizuoka (JP)

( * ) Notice: Subject to any disclaimer, the term of this patent is extended or adjusted under 35 U.S.C. 154(b) by 75 days.

(21) Appl. No.: 16/467,585

(22) PCT Filed: Dec. 14, 2016

(86) PCT No.: PCT/JP2016/087239
§ 371 (c)(1),
(2) Date: Jun. 7, 2019

(87) PCT Pub. No.: WO2018/109870
PCT Pub. Date: Jun. 21, 2018

(51) Int. Cl.
*F02D 41/08* (2006.01)
*F02D 41/00* (2006.01)
*F02D 29/06* (2006.01)
*F02B 63/04* (2006.01)

(52) U.S. Cl.
CPC .......... *F02D 41/083* (2013.01); *F02B 63/042* (2013.01); *F02D 29/06* (2013.01); *F02D 41/0002* (2013.01)

(58) Field of Classification Search
CPC .... F02D 41/083; F02D 41/0002; F02D 29/06; F02B 63/42
See application file for complete search history.

(56) References Cited

U.S. PATENT DOCUMENTS

| | | | | |
|---|---|---|---|---|
| 4,174,697 A | * | 11/1979 | Podrapsky | F02P 5/1556 123/406.56 |
| 5,054,446 A | | 10/1991 | Ohuchi | |
| 5,714,871 A | | 2/1998 | Endou | |
| 2005/0073279 A1 | * | 4/2005 | Fenley | B60K 6/48 318/717 |
| 2008/0036624 A1 | * | 2/2008 | Ausman | G08B 21/185 340/945 |

(Continued)

FOREIGN PATENT DOCUMENTS

| | | |
|---|---|---|
| JP | S60074998 A | 4/1985 |
| JP | S62-642 | 1/1987 |
| JP | 63-189650 | 8/1988 |

(Continued)

OTHER PUBLICATIONS

International Search Report for PCT/JP2016/087239, dated Mar. 21, 2017.

*Primary Examiner* — George C Jin
(74) *Attorney, Agent, or Firm* — Pearne & Gordon LLP

(57) ABSTRACT

Disclosed is an engine drive system that uses an open-type regulator as a regulator that rectifies an output and adjusts a voltage of a magneto AC generator driven by an engine. A means is provided that performs a process of increasing an opening degree of an ISC valve for a limited amount of time when a load of the generator is applied, while the engine is idling. Temporarily increasing an output torque of the engine prevents a rotational speed of the engine from dramatically decreasing, or the engine from stalling, during idling.

20 Claims, 17 Drawing Sheets

(56) References Cited

U.S. PATENT DOCUMENTS

2008/0143119 A1* 6/2008 Asada .................. H02P 9/10
                                                    290/40 B
2009/0255509 A1* 10/2009 Sato .................. F02D 29/06
                                                    123/339.2

FOREIGN PATENT DOCUMENTS

| JP | H03237241 A | 10/1991 |
| JP | H06241085 A | 2/1993 |
| JP | H07-224696 | 8/1995 |
| JP | H08-23642 | 1/1996 |
| JP | H08284712 A | 10/1996 |
| JP | H09014029 A | 1/1997 |
| JP | H09032612 A | 2/1997 |
| JP | 2007-189827 | 7/2007 |

* cited by examiner

ENGINE DRIVE SYSTEM

TECHNICAL FIELD

The present invention relates to an engine drive system provided with an engine (internal combustion engine), a magneto AC generator (magneto) driven by the engine, a regulator that rectifies an AC output of the generator and adjusts an output voltage of the magneto AC generator, and an electronic control unit in which at least the engine is a control object.

BACKGROUND ART

As is well known, in recent engine drive systems, engine startup control, idle control, control during normal operation, and other various controls are performed by an electronic control unit (ECU). An electronic control unit is configured by accommodating, within a shared package, at least part of a circuit for driving an ignition device, a fuel injection device, or another electrical component needed to activate an engine, as well as a microcomputer constituting various control means that control these electrical components, thus forming a unit.

The electronic control unit is provided with various function-implementing means configured by causing the CPU to execute a predetermined program. The function-implementing means configured within the electronic control unit are, for example, a startup control means that controls startup of the engine, an idle rotation control means that controls rotation of the engine during idling, a means that controls rotation of the engine during steady running, and the like.

When the engine is provided with an idle speed control (ISC) valve that bypasses a throttle valve, the idle rotation control means uses this ISC valve as an operating part (idle rotational speed regulation part) and maintains an idle rotational speed at a target rotational speed by performing feedback control while the engine is idling. An idle opening degree control means determines a deviation between a feedback value of a rotational speed of the engine and a target idle rotational speed, calculates an idle-control target opening degree, which is a target opening degree of the ISC valve needed to bring this deviation to zero, sends to a drive part (stepping motor, solenoid, etc.) of the ISC valve a drive signal needed to bring the opening degree of the ISC valve to the calculated target opening degree, and adjusts the opening degree of the ISC valve to the target opening degree, thereby maintaining the idle rotational speed at the target rotational speed.

When a magneto AC generator is driven by the engine to obtain power supplied to a DC electrical load, a regulator (voltage adjustment device) that rectifies AC output of the generator and adjusts voltage must be provided between an armature coil of the generator and a pair of output terminals to which the electrical load is connected, in order to prevent a voltage supplied from the generator to the electrical load from becoming excessive.

When an alternator is used as the generator attached to the engine, an output voltage of the generator can be adjusted by adjusting a field current, but the magneto AC generator does not have a field coil, and it is therefore not possible to employ voltage adjustment methods that are used when alternators are used. Therefore, when a magneto AC generator is used as the generator attached to the engine, a short-circuit-type regulator or an open-type regulator is used as the regulator that rectifies the output of the generator and adjusts the voltage.

As shown in, for example, FIG. 2 of Japanese Laid-open Patent Application No. 2007-189827, a short-circuit-type regulator is configured from a rectifier circuit that is composed of bridged diodes and that performs full-wave rectification on an AC voltage induced in an armature coil of the generator, a thyristor serving as a short-circuiting switch connected in inverse parallel to each of diodes constituting a lower side of a bridge of the rectifier circuit, a pair of output terminals to which a rectified output of the generator is applied from the armature coil through the rectifier circuit, a voltage detection circuit that detects a voltage between the output terminals, and a thyristor trigger circuit that triggers the thyristor serving as a short-circuiting switch when the voltage detected by the voltage detection circuit exceeds a set value. Ordinary, a battery, capacitor, or other voltage accumulation means is connected between the output terminals to which the electrical load of the generator is connected. Various electrical loads are connected to both ends of the voltage accumulation means.

In a short-circuit-type regulator, the thyristor serving as a short-circuiting switch is kept in an OFF state when the voltage between the output terminals is equal to or less than the set value, and the AC voltage induced in the armature coil of the generator is supplied between the output terminals through the rectifier circuit. When the voltage between the output terminals exceeds the set value, the thyristor serving as a short-circuiting switch connected in inverse parallel to each of the diodes constituting the lower side of the bridge of the rectifier circuit is changed to an ON state, whereby the armature coil is short-circuited through the thyristor and diodes constituting an upper side of the bridge of the rectifier circuit, and an excessive voltage is prevented from being applied to an electrical load from the armature coil through the output terminals.

In an open-type regulator, as is indicated in Japanese Laid-open Patent Application No. 8-23642, diodes are used to constitute, for example, an upper side of a bridge of a full-bridge, full-wave rectifier circuit that rectifies an induced voltage of an armature coil, a lower side of the bridge is configured from MOSFETs or other voltage-adjusting switches that can be controlled to ON and OFF, and voltage is adjusted by controlling these switches to ON and OFF.

In the open-type regulator, when the voltage between the output terminals is equal to or less than the set value, the AC voltage induced in the armature coil is rectified and applied between the output terminals by putting the voltage-adjusting switches in an ON state, and when the voltage between the output terminals exceeds the set value, control is performed so that the voltage between the output terminals does not exceed the set value by putting the voltage-adjusting switches in an OFF state and electrically disconnecting the armature coil and the output terminals.

PRIOR ART DOCUMENTS

Patent Documents

[Patent Document 1] Japanese Laid-open Patent Application No. 2007-189827
[Patent Document 2] Japanese Laid-open Patent Application No. 8-23642

DISCLOSURE OF THE INVENTION

Problems to be Solved by the Invention

In an engine drive system in which a rotor of a magneto AC generator is joined to a crankshaft of an engine, when a short-circuit-type regulator is used as a regulator that adjusts a voltage applied between output terminals for load connection from an armature coil of the generator, a current flows to the armature coil and a normally adequate mechanical load is therefore applied from the generator to the engine in both a time period in which a short-circuiting switch of a regulator is in an ON state and a time period in which the switch is in an OFF state, and the engine generates torque needed to drive this mechanical load even while idling. Therefore, an idle rotational speed does not dramatically decrease even when a large electrical load is connected to the generator while the engine is idling.

However, when a short-circuit-type regulator is used, a normally adequate mechanical load is applied to the engine from the generator in which a short-circuit current flows while the engine is idling, and the engine must idle in a state in which the torque needed to drive this load is generated; therefore, poor fuel consumption in the engine is unavoidable.

Conversely, when an open-type regulator is used, the armature coil and the load-connecting output terminals are electrically disconnected when an electrical load is not connected to the generator during idling. In this case, almost no mechanical load is applied from the generator to the engine, and the engine idles in a state of maintaining a low output torque. Therefore, when an open-type regulator is used, an amount of fuel consumed during idling can be reduced, and fuel consumption can be greatly improved over cases in which a short-circuit-type regulator is used.

However, when an open-type regulator is used, the engine idles in a state of exceedingly reduced output torque when an electrical load is not connected to the generator, and the idle rotational speed therefore dramatically decreases when an electrical load is connected to the generator during idling. When the electrical load of the generator is disconnected while the engine is idling in a state in which the electrical load is connected to the generator, the mechanical load applied from the generator to the engine abruptly lightens, and the idle rotational speed of the engine therefore abruptly increases. Therefore, when an open-type regulator is used as the regulator that adjusts the output of the magneto AC generator, dramatic fluctuation occurs in the idle rotational speed along with the connecting and disconnecting of the electrical load of the generator, which is undesirable because problems occur such as the electrical load being adversely affected. When, during idling, a large electrical load is suddenly connected to the generator that is in a state of zero electrical load or light load, the idle rotational speed dramatically decreases, and in worst cases, the engine could stall.

The electronic control unit is provided with an idle rotation control means that uses an ISC valve as an operating part and maintains the idle rotational speed at a target value by performing feedback control on the idle rotational speed, but when feedback control is employed, after an electrical load is connected to the generator during idling, control of the ISC valve is first initiated when the idle rotational speed of the engine is detected to have actually decreased. Moreover, even if a target opening degree of the ISC valve is revised in order to return the decreased idle rotational speed to a target rotational speed, the effect will be apparent and delays will inevitably occur until the effect will be apparent and the decreased idle rotational speed shifts to increasing, making it impossible to prevent large fluctuations in the idle rotational speed or stalling of the engine.

Recently, there has been strong demand for improved fuel consumption in engines as one measure for preventing global warming. Therefore, in an engine drive system that uses a magneto AC generator as a generator attached to an engine, the use of an open-type regulator as a regulator that adjusts a voltage applied from the generator to an electrical load has been investigated. However, to use an open-type regulator, measures must be taken to prevent problems such as large rotational speed fluctuations and engine stalls when an electrical load is connected while the engine is idling.

It is an object of the present invention to prevent large fluctuations from occurring in the idle rotational speed, or to prevent the engine from stalling, in the event that an open-type regulator is used as the regulator that adjusts the voltage applied between the load-connecting output terminals from the armature coil of the generator in an engine drive system that uses a magneto AC generator as the generator attached to the engine, the fluctuation in speed and stalling of the engine being due to an electrical load being connected to the generator while the engine is idling.

Means to Solve the Problems

The present invention is intended to provide an engine drive system provided with: an engine having an ISC valve that bypasses a throttle valve; a magneto AC generator driven by the engine; a regulator provided between an output end of the generator and a pair of output terminals to which a load of the generator is connected, the regulator adjusting a voltage and rectifying an AC output of the generator; and an electronic control unit in which at least the engine is a control object.

The engine drive system that is an object of the present invention encompasses not only engine drive systems (engine generators) in which the load driven by the engine is only a magneto AC generator, but also systems configured so that the engine also drives yet other mechanical loads besides a generator, such as engine-driven vehicles, agricultural machinery, and the like.

The regulator used in the system according to the present invention comprises an open-type regulator configured such that when a voltage between the output terminals is equal to or less than a set value, the regulator rectifies the AC output of the generator and outputs the output through the output terminals, and when the voltage between the output terminals exceeds the set value, the regulator electrically disconnects the output terminals and the output end of the generator, thereby preventing a voltage that exceeds the set value from being applied to the output terminals.

The electronic control unit used in the system according to the present invention includes: a valve operation means that operates the ISC valve so that an opening degree of the ISC valve is brought to a given target opening degree; a load fluctuation detection means that detects a load fluctuation of the generator occurring while the engine is idling; and a target opening degree setting means configured so that when the load fluctuation detection means has not detected a load fluctuation, an idle-control target opening degree is sent as the idle-control target opening degree of the ISC valve to the valve operation means, the idle-control target opening degree being the target opening degree of the ISC valve when feedback control is performed so as to maintain an idle rotational speed at a target value, and when the load fluctuation detection means has detected a load fluctuation, a corrected target opening degree is given as the target opening degree of the ISC valve to the valve operation means for a limited amount of time, after which the target opening degree given to the valve operation means is returned to the idle-control target opening degree, the corrected target opening degree being the idle-control target opening degree that is corrected by a correction amount designed to minimize a fluctuation in the idle rotational speed occurring due to the load fluctuation.

When the load of the generator is applied (when the load is connected to the output terminals) while the engine is idling, a mechanical load applied from the generator to the engine becomes heavier and the idle rotational speed therefore decreases. When the load is cut off from the generator (disconnected from the output terminals) during idling, the mechanical load applied from the generator to the engine lightens and the idle rotational speed increases. There will inevitably be a delay until the rotational speed of the engine actually begins to decrease after the load is applied, and there will also inevitably be a delay until the idle rotational speed of the engine actually begins to increase after the load is cut off.

In the present invention, the system is configured such that when a fluctuation in the electrical load of the generator is detected while the engine is idling, a corrected target opening degree is sent as the target opening degree of the ISC valve to the valve operation means for a limited amount of time, after which the target opening degree sent to the valve operation means is returned to the idle-control target opening degree, the corrected target opening degree being the idle-control target opening degree corrected by a correction amount designed to minimize a fluctuation in the idle rotational speed occurring due to the load fluctuation. When the system is thus configured, the opening degree of the ISC valve can be corrected before the idle rotational speed begins to decrease or at least before the idle rotational speed dramatically decreases, and an output torque of the engine can be adjusted so as to minimize the fluctuation in the idle rotational speed, making it possible to prevent the idle rotation speed from fluctuating too widely and the engine from stalling while idling. Additionally, because the corrected target opening degree is sent for a limited amount of time as the target opening degree of the ISC valve to the valve operation means, an effect on a control action that maintains the idle rotational speed at a target rotational speed is kept to a minimum, and it is possible to prevent the idle rotational speed from dramatically fluctuating when the load of the generator is applied and when the load is cut off during idling, and also to prevent the engine from stalling when the load of the generator is applied.

Thus, according to the present invention, when the load of the generator fluctuates during idling, there are no problems of significant fluctuation in the idle rotational speed or stalling of the engine, and an open-type regulator can be used to adjust voltage. Therefore, less fuel can be consumed by the engine during idling than when a short-circuit-type regulator is used, and fuel consumption of the engine can be improved.

In the present invention, in order for the corrected target opening degree to be sent as the target opening degree of the ISC valve to the valve operation means for a limited amount of time when a fluctuation has been detected in the load of the generator during idling, the target opening degree setting means is preferably configured so that the target opening degree sent to the valve operation means is brought to the corrected target opening degree when the load fluctuation of the generator has been detected, and the target opening degree is then returned to the idle-control target opening degree when a set amount of time has elapsed.

The target opening degree setting means may also be configured so that the corrected target opening degree is sent as the target opening degree to the valve operation means when the load fluctuation has been detected, and the target opening degree sent to the valve operation means is then returned to the idle-control target opening degree when a state is established indicating that the idle rotational speed has converged on the target value.

In a preferred aspect of the present invention, the electronic control unit is further provided with a load application/cutoff control means that controls application and cutting off of a controlled load, the controlled load being at least one of loads of the generator that is sometimes connected to the output terminals while the engine is idling. In this case, the load fluctuation detection means is configured so as to acquire, from the load application/cutoff control means, information that a load will be applied and information that the load will be cut off, and to detect a fluctuation in the load.

When the system is configured as described above, it is possible to know that the load of the generator will fluctuate before the load actually fluctuates. Therefore, before the idle rotational speed begins to fluctuate due to the fluctuation in the load, the opening degree of the ISC valve is corrected so as to minimize the fluctuation in the idle rotational speed, and fluctuations in the idle rotational speed can be reliably minimized.

The target opening degree sent to the valve operation means operating the ISC valve may be corrected by correcting the idle-control target opening degree calculated by the means for calculating the idle-control target opening degree and may be corrected by correcting the target rotational speed sent to the means for calculating the idle-control target opening degree.

In another preferred aspect of the present invention, a battery is connected between the output terminals, and the load fluctuation detection means is configured so as to detect the load fluctuation when a change in voltage between the output terminals has been detected. In this case, the target opening degree setting means is configured so as to determine the correction amount in accordance with an extent of the change in voltage between the output terminals when the load fluctuation has been detected.

When a battery is connected between the output terminals to which the load of the generator is connected and an electrical load is connected between the output terminals during idling, a battery voltage first decreases due to a current flowing from the battery to the electrical load, a charging current then flows from an armature coil of the generator through the regulator to the battery when the battery voltage has decreased to a charging initiation voltage, and the mechanical load applied from the generator to the engine begins to increase. Thus, when a battery is connected between the output terminals, a delay occurs to some degree until the load applied from the generator to the engine increases after an electrical load is connected. Therefore, this decrease in the battery voltage is accurately detected, whereby the load applied from the generator to the engine increases due to the connection of the electrical load before the idle rotational speed begins to decrease, the decrease in the idle rotational speed is detected early, the opening degree of the ISC valve can be increased, and the decrease in the idle rotational speed can be minimized.

Yet other aspects of the present invention are made clear in the description of embodiments given below.

Advantageous Effects of the Invention

According to the present invention, when an electrical load of the generator fluctuates while the engine is idling, it is possible to correct the opening degree of the ISC valve and to minimize the fluctuation in the idle rotational speed before the idle rotational speed begins to fluctuate or at least before the fluctuation in the idle rotational speed becomes large.

Therefore, according to the present invention, when an electrical load is applied to the generator during idling, there are no problems of significant decreases in the idle rotational speed or stalling of the engine, an open-type regulator can be used to adjust voltage, less fuel can be consumed by the engine during idling than when a a short-circuit-type regulator is used, and fuel consumption of the engine can be improved.

BEST MODE FOR CARRYING OUT THE INVENTION

Embodiments of the present invention are described in detail below with reference to attached drawings.

Figure 1:
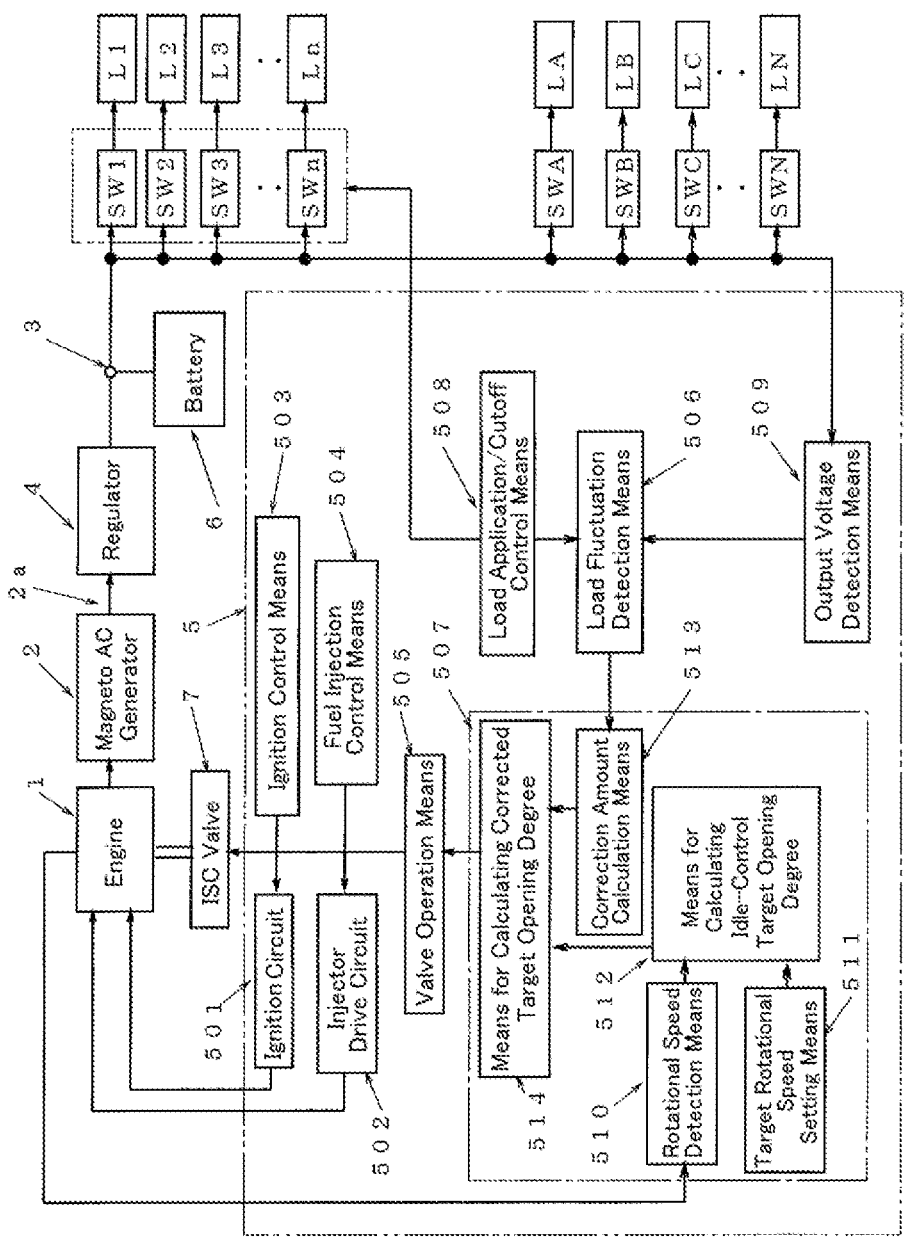
FIG. 1 is a block diagram showing a configuration of a principal part of a first embodiment of the present invention.

FIG. 1 shows a first embodiment of the present invention. An engine drive system according to the present embodiment is provided with: an engine 1; a magneto AC generator 2 provided with a rotor that has a magnetic field generated by a permanent magnet and stator that has an armature coil, the rotor being joined with a crankshaft of the engine 1; a load-connecting output terminal 3 to which electrical loads L1-Ln and LA-LN of the magneto AC generator 2 are connected; a regulator 4 provided between the output terminal 3 and an output terminal (output terminal of the armature coil) 2a of the magneto AC generator 2, the regulator 4 rectifying an AC output of the generator 2 and adjusting a voltage; and an electronic control unit (ECU) 5 in which at least the engine 1 as a control object. FIG. 1 shows only one load-connecting output terminal 3, but in practice a pair of output terminals 3 are provided as a positive output terminal and a negative output terminal to which DC electrical loads are connected.

The engine drive system of the present embodiment is an engine generator in which the engine 1 is a drive source and DC power for driving the electrical loads is obtained. No load other than the magneto AC generator 2 is therefore connected to the engine 1, but the present invention can also be applied to an engine drive system in which a mechanical load other than the magneto AC generator 2 is connected to the engine 1. Examples include automobiles and other vehicles, as well as agricultural machinery.

The electrical loads L1-Ln are connected between the pair of output terminals 3 via respective load-applying switches SW1-SWn, and the electrical loads LA-LN are connected via respective load-applying switches SWA-SWN.

In the present embodiment, at least one of the electrical loads of the generator 2 that is sometimes connected to an output terminal when the engine is idling is designated as a controlled load for which application to the generator (connecting to the output terminal 3) and cutting off from the generator (disconnecting from the output terminal 3) is controlled by the electronic control unit 5.

In the present embodiment, the loads L1-Ln are designated as controlled loads, and the ON-OFF states of the switches SW1-SWn respectively provided between these loads and the output terminals 3 are controlled by the electronic control unit 5.

The switches SWA-SWN are not controlled by the electronic control unit, and are switches that are set to ON and OFF as appropriate by an operation performed by an operator, thermo switches that go into an ON state when a temperature of a specific object has exceeded a set value, limit switches that are activated when a specific movable member has reached a limit position, or the like.

The engine 1 is provided with an ISC valve 7 that bypasses a throttle valve (not shown) in order to control idle rotation. The ISC valve 7 is provided with a valve-operating part having a step motor, a solenoid, or another drive source in order to electrically operate the valve applied. The ISC valve 7 can be operated so that an opening degree thereof is brought to a predetermined target opening degree by sending the target opening degree as an electric signal to the valve-operating part.

The regulator 4 used in the present embodiment is an open-type regulator configured such that when a voltage between the load-connecting output terminals 3 is equal to or less than a set value, the regulator rectifies an output voltage of the generator 2 and outputs this voltage through the output terminals 3, and when the voltage between the output terminals 3 exceeds the set value, the regulator electrically disconnects the output terminal 2a of the generator 2 from the output terminals 3, thereby preventing the voltage between the output terminals 3 from exceeding the set value.

Figure 7:
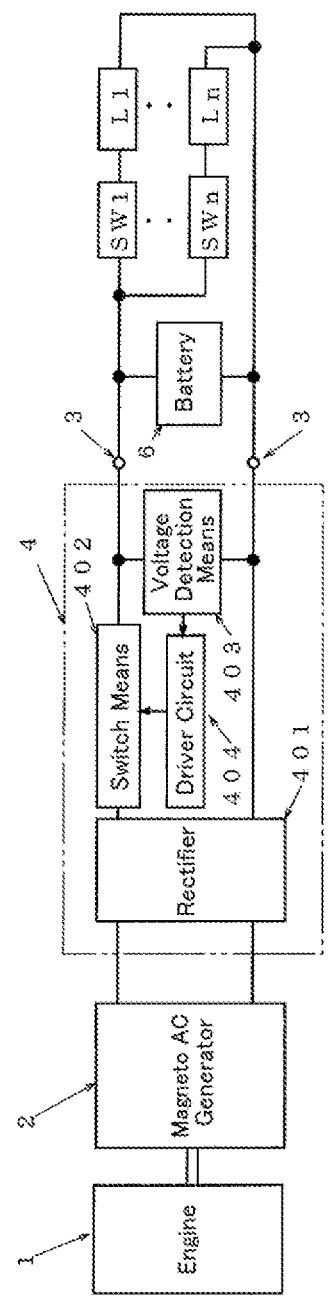
FIG. 7 is a block diagram schematically showing an example of a configuration of an open-type regulator.

The open-type regulator 4 is configured as shown, for example, in FIG. 7. The regulator 4 shown in FIG. 7 is configured from a rectifier 401 that rectifies the output voltage of the magneto AC generator 2, a switch means 402 inserted between the output terminals 3 and a DC output terminal of the rectifier 401, a voltage detection means 403 that detects the voltage between the output terminals 3, 3, and a driver circuit 404 that sends a drive signal to the switch means 402 and brings the switch means into an ON state when the voltage between the output terminals 3, 3 detected by the voltage detection means 403 is equal to or less than the set value, and that stops supplying the drive signal to the switch means 402 and brings the switch means 402 into an OFF state when the voltage between the output terminals 3, 3 detected by the voltage detection means 403 exceeds the set value. The switch means 402 is configured from a bipolar transistor, a MOSFET, or another semiconductor switch element that can be controlled to ON and OFF.

When the voltage between the output terminals 3, 3 to which the electrical load of the generator 2 is connected is equal to or less than the set value, the regulator 4 shown in FIG. 7 brings the switch means 402 into an ON state and causes the DC voltage obtained by rectifying the output voltage of the generator 2 to be outputted through the output terminals 3, 3, and when the voltage between the output terminals 3, 3 exceeds the set value, the regulator 4 brings the switch means 402 into an OFF state and electrically disconnects the output terminal 2a of the generator from the output terminals 3, 3, thereby preventing the voltage between the output terminals 3, 3 from exceeding the set value.

In the example shown in FIG. 7, the switch means 402 is provided outside of the rectifier 401, but the switch means 402 can also be provided inside the rectifier 401. For example, when a full-bridge, full-wave rectifier is used as the rectifier 401, either one of an upper side or a lower side of a bridge constituting the rectifier 401 can be configured from diodes, the other one can be configured from switch means such as MOSFETs that can be controlled to ON and OFF, and the regulator 4 can be configured so as to perform a voltage adjustment action putting the switch means in an ON state when the voltage between the output terminals 3, 3 detected by the voltage detection means 403 is equal to or less than the set value, and putting the switch means in an OFF state when the voltage between the output terminals 3, 3 detected by the voltage detection means 403 exceeds the set value.

In the embodiment shown in FIG. 1, the electronic control unit 5 is configured by accommodating a microcomputer and at least part of a circuit needed to drive an ignition device, a fuel injection device, or another electrical component needed to activate the engine, within a shared package, thus constituting a unit. The microcomputer is provided with a CPU, RAM, ROM, and other storage devices, various interfaces, etc., and the microcomputer constitutes a means for carrying out various functions by causing the CPU to execute predetermined programs stored in the ROM.

The electronic control unit 5 shown in the drawings is provided with an ignition circuit 501, an injector drive circuit 502, an ignition control means 503, a fuel injection control means 504, a valve operation means 505 that drives the operating part of the ISC valve 7 so that the opening degree of the ISC valve is brought to the set target opening degree, a load fluctuation detection means 506 that detects a load fluctuation of the generator 2 occurring when the engine is idling, a target opening degree setting means 507 that sets the target opening degree of the ISC valve sent to the valve operation means 505, a load application/cutoff control means 508 that controls the ON and OFF states of the switches SW1-SWn in order to control an application and cutoff of the controlled loads L1-Ln, and an output voltage detection means 509 that detects the voltage between the output terminals 3 to which the electrical load of the generator 2 is connected.

Of the constituent elements of the electronic control unit 5, the ignition circuit 501 and the injector drive circuit 502 are composed of hardware circuits. The ignition control means 503, the fuel injection control means 504, the valve operation means 505, the load fluctuation detection means 506, the target opening degree setting means 507, the load application/cutoff control means 508, and the output voltage detection means 509 are each at least partially configured by causing the CPU of the microcomputer to execute a predetermined program.

To describe these components in further detail, the ignition circuit 501 is a circuit that controls a primary current of an ignition coil (not shown), and, together with the ignition coil and an ignition plug attached to a cylinder of the engine and connected to a secondary coil of the ignition coil, constitutes the ignition device of the engine. The ignition circuit 501 is a circuit that causes an abrupt change in the primary current of the ignition coil (not shown) when an ignition command signal is sent during an ignition period of the engine and induces a high voltage in the secondary coil of the ignition coil. Ignition circuits having various configurations are known.

The ignition control means 503 is a means whereby a timing at which the ignition command signal is sent to the ignition circuit 501 is controlled in relation to a rotational speed of the engine and various other control conditions, and the ignition control means 503 controlling the ignition period of the engine.

The injector drive circuit 502 is a circuit that supplies a drive pulse to an injector (fuel injection valve) when an injection command signal is sent. The injector is provided with, for example: an injector body having a fuel injection port in a distal end thereof, fuel being supplied at a constant pressure inside the injector body; a valve that opens and closes the fuel injection port; a spring that urges the valve toward a closed position; and a solenoid that, when excited, drives the valve to open against an urging force of the spring.

When a drive pulse is sent to the solenoid, the valve is opened and the fuel is injected into an intake pipe or a cylinder of the engine, or another fuel injection space.

The fuel injection control means 504 is a means whereby a timing at which the fuel is injected from the injector and a fuel injection amount are controlled by controlling a width of the drive pulse and a timing at which the drive pulse is sent to the injector drive circuit 502.

The valve operation means 505 sends an operation signal to the operating part of the ISC valve so that the opening degree of the ISC valve 7 is brought to the target opening degree sent from the target opening degree setting means 507 and performs an operation so that the opening degree of the ISC valve 7 is brought to the target opening degree.

When a condition for applying any of the controlled loads L1-Ln (connecting the loads to the output terminals 3) has been met, or when the operator has sent a command to apply any load to the CPU of the electronic control unit, the load application/cutoff control means 508 sends a drive signal to a switch that, of the switches SW1-SWn, corresponds to the load to be applied, and this switch is put in an ON state. When a condition is met for cutting off the load among the controlled loads L1-Ln that have been applied, or when the operator sends to the CPU a command to stop the driving of the controlled load that has been driven, the load application/cutoff control means 508 removes the drive signal that had been sent to the switch that, of the switches SW1-SWn, corresponds to the controlled load to be stopped driving, and this switch is put in an OFF state, whereby the controlled load is cut off from the generator.

The load application/cutoff control means 508 is also configured so as to output load application notification information serving as a notification as to the specifics of an applied load, either when or immediately before a load L1-Ln is applied, and to output load cutoff notification information serving as a notification as to the specifics of a cut-off load, either when or immediately before the applied load is cut off from the generator 2. These items of information are sent to the load fluctuation detection means 506.

Upon acquiring load application notification information that a specific load will be applied from the load application/cutoff control means 508, the load fluctuation detection means 506 detects that a load fluctuation will occur, in which the load of the generator 2 will increase in proportion to the magnitude of the load, the application of which having been notified by the load application notification information, and upon acquiring load cutoff notification information that a specific load will be cut off from the load application/cutoff control means 508, the load fluctuation detection means 506 detects that a load fluctuation will occur, in which the load of the generator 2 will decrease in proportion to the magnitude of the load, the application of which having been notified by the load cutoff notification information.

The load fluctuation detection means 506 used in the present embodiment is configured so as to detect that a fluctuation has occurred in the load of the generator 2 also when a voltage change (voltage decrease or voltage increase) between the output terminals 3 has been detected. In cases in which a battery 6 is connected between the output terminals 3, when a load is connected between the output terminals, the voltage between the output terminals decreases, and when the load that had been connected to the output terminals 3 is disconnected from the output terminals, the voltage between the output terminals increases; therefore, by monitoring the voltage detected by the output voltage detection means 509, it is possible to detect that a load had been applied to the generator 2 and that the load that had been applied was cut off from the generator 2.

The target opening degree setting means 507 is configured so that: when the load fluctuation detection means 506 has not detected a load fluctuation, an idle-control target opening degree is sent as the target opening degree of the ISC valve to the valve operation means 505, the idle-control target opening degree being the target opening degree of the ISC valve 7 when feedback control is performed so as to maintain an idle rotational speed at a target value; and when the load fluctuation detection means has detected a load fluctuation, a corrected target opening degree is sent as the target opening degree of the ISC valve to the valve operation means 505 for a limited amount of time, after which the target opening degree sent to the valve operation means 505 is returned to the idle-control target opening degree, the corrected target opening degree being the idle-control target opening degree corrected by a correction amount designed to minimize a fluctuation in the idle rotational speed occurring due to the load fluctuation.

To carry out these functions, the target opening degree setting means 507 used in the present embodiment is provided with a rotational speed detection means 510, a target rotational speed setting means 511, a means 512 for calculating the idle-control target opening degree, a correction amount calculation means 513, and a means 514 for calculating the corrected target opening degree.

The rotational speed detection means 510 detects the rotational speed of the engine 1 on the basis of a signal that includes information about the rotational speed of the engine 1. The signal that includes information about the rotational speed of the engine can be, for example, a pulse voltage induced in a primary side of the ignition coil constituting the ignition device when the engine 1 is ignited. In cases in which there is provided a pickup coil that generates a pulse signal at a pre-established crank angle position in synchronization with the rotation of the engine, the rotational speed detection means 510 can be configured so as to detect the rotational speed of the engine from the cycle in which this pickup coil generates an output pulse.

The means 512 for calculating the idle-control target opening degree is configured so as to calculate a deviation between a detected value of the idle rotational speed detected by the rotational speed detection means 510 and a target value of the idle rotational speed that is set by the target rotational speed setting means 511, and to calculate, as a target opening degree θiscf in idle control, the opening degree of the ISC valve 7 that is needed to bring the calculated deviation to zero.

When the load fluctuation detection means 506 has detected a load fluctuation, the correction amount calculation means 513 calculates, in accordance with an extent of the detected load fluctuation, a correction amount of the idle-control target opening degree needed to minimize fluctuation in the idle rotational speed occurring due to the load fluctuation. The correction amount of the idle-control target opening degree needed to minimize fluctuation in the idle rotational speed occurring due to the load fluctuation is calculated by, for example: creating a correction amount calculation map on the basis of experimental results, the map providing a relationship between a fluctuation amount ΔR of the load of the generator 2, an idle rotational speed N, and a correction amount Δθisc of the idle-control target opening degree; and searching the map for the fluctuation amount ΔR of the load detected by the load fluctuation detection means 506 and for the idle rotational speed N detected by the rotational speed detection means 510.

The correction amount Δθisc of the opening degree of the ISC valve needed to minimize fluctuation in the idle rotational speed occurring along with load fluctuation increases with increased idle rotational speed, and increases with increased load fluctuation amount; therefore, the correction amount calculation map is preferably created so that as the load fluctuation amount increases, the correction amount Δθisc is increased correspondingly, and as the idle rotational speed rises, the correction amount Δθisc is increased correspondingly. In the present embodiment, the correction amount Δθisc is calculated as an amount added to or subtracted from the target opening degree θiscf in idle control; when the idle-control target opening degree is corrected so as to increase the opening degree of the ISC valve, the correction amount Δθisc is calculated as an amount having a positive sign, and when the idle-control target opening degree is corrected so as to reduce the opening degree of the ISC valve, the correction amount Δisc (*3) is calculated as an amount having a negative sign.

The means 514 for calculating the corrected target opening degree uses the correction amount Δθisc calculated by the correction amount calculation means 513 and calculates a corrected target opening degree Δθisc by performing a corrective calculation on the idle-control target opening degree calculated by the means 512 for calculating the idle-control target opening degree, and sends the corrected target opening degree Δθisc as the target opening degree of the ISC valve 7 to the valve operation means 505. When configured so as to determine the corrected target opening degree by adding or subtracting the correction amount to or from the target opening degree θiscf in idle control, the means 514 for calculating the corrected target opening degree used in the present embodiment calculates the corrected target opening degree Δθisc according to the calculation formula θisc=θiscf+Δθisc.

The correction amount described above can also be given in the form of a percentage Δθ % relative to the idle-control target opening degree. In this case, the corrected target opening degree Δθisc is calculated according to the calculation formula θisc=θiscf×Δθ (%)/100.

To reduce an effect of the idle rotational speed on the feedback control, the process of correcting the opening degree of the ISC valve in order to minimize the fluctuation in the idle rotational speed occurring due to the load fluctuation of the generator is preferably performed for the minimum amount of time needed to minimize the fluctuation in the idle rotational speed. Therefore, the target opening degree setting means 507 is configured so that: when the load fluctuation detection means 506 has not detected that the load of the generator 2 has fluctuated, the idle-control target opening degree calculated by the means 512 for calculating the idle-control target opening degree is sent as the target opening degree of the ISC valve 7 to the valve operation means 505; and when the load fluctuation detection means 506 has detected that the load of the generator 2 has fluctuated, the corrected target opening degree calculated by the means 514 for calculating the corrected target opening degree is sent as the target opening degree of the ISC valve to the valve operation means 505 for a limited amount of time, after which the target opening degree sent to the valve operation means 505 is returned to the idle-control target opening degree.

To cause the process of correcting the target opening degree of the ISC valve to be performed for a limited amount of time, the target opening degree setting means is preferably configured so that, for example, the corrected target opening degree is sent as the target opening degree to the valve operation means for a limited amount of time when a load fluctuation of the generator has been detected, after which the target opening degree sent to the valve operation means is returned to the idle-control target opening degree.

As described above, the target opening degree setting means 507 used in the present embodiment is configured so that: when the load fluctuation detection means 506 has detected a load fluctuation by acquiring information serving as a notification that a load will be applied from the load application/cutoff control means 508, the target opening degree sent to the valve operation means 505 is increased above the idle-control target opening degree by a correction amount that is set according to the magnitude of the applied load (the extent of the load fluctuation); and when the load fluctuation detection means 506 has detected a load fluctuation by acquiring information serving as a notification that a load will be cut off from the load application/cutoff control means 508, the target opening degree sent to the valve operation means 505 is reduced below the target opening degree θiscf in idle control by a correction amount that is set according to the magnitude of the cut-off load (the extent of the load fluctuation).

When the target opening degree setting means 507 is configured in this manner, the load application/cutoff control means 508 is preferably configured so that: after the information serving as a notification that a load will be applied has been sent to the load fluctuation detection means 506, the load is applied when it has been confirmed that the idle rotational speed has increased to a set rotational speed Non that permits load application, the increase in the idle rotational speed being brought about by the increase in the target opening degree sent to the valve operation means 505; and after the information serving as a notification that the load of the generator 2 will be cut off has been sent to the load fluctuation detection means 506, the load is cut off when it has been confirmed that the idle rotational speed has decreased to a set rotational speed Noff that permits the load to be cut off, the decrease in the idle rotational speed being brought about by the reduction in the target opening degree sent to the valve operation means 505.

Figure 8:
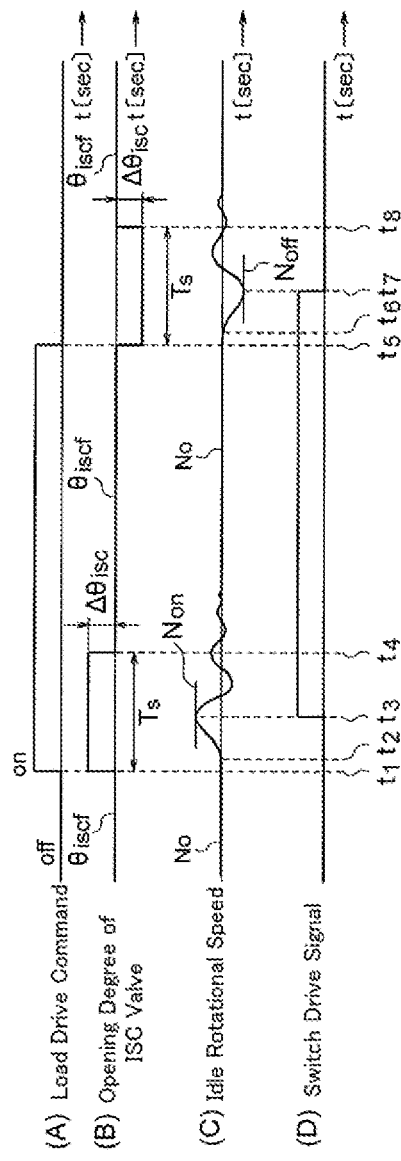
FIG. 8 is a timing chart used to describe actions of an embodiment of the present invention.

Referring to FIG. 8, a time chart depicts a time series of the actions of the components performed when an increase in the load of the generator has been detected and when the load has decreased in a case in which the target opening degree setting means 507 and the load application/cutoff control means 508 are configured in the manner described above. As shown in (A) in the example shown in FIG. 8, a load drive command has been sent at time t1, and load application notification information serving as a notification that a load L1 will be applied is therefore sent from the load application/cutoff control means 508 to the load fluctuation detection means 506. The load fluctuation detection means 506 obtains, from this load application notification information, information that the load L1 will be applied, and detects that the load of the generator will increase in proportion to the load L1. The target opening degree setting means 507 therefore increases the target opening degree sent to the valve operation means 505 above the target opening degree θiscf in idle control by the correction amount Δθisc calculated according to the amount of increase in the load, as shown in FIG. 8(B). The valve operation means 505 thereby increases the opening degree of the ISC valve 7 to a corrected target opening degree θiscf+Δθisc, and the idle rotational speed N thereby increases above a target rotational speed No after time t2 occurring later than time t1 by a fixed amount of time, as shown in FIG. 8(C).

The load application/cutoff control means 508 sends a drive signal to the switch SW1 and brings this switch into an ON state when the idle rotational speed N has increased, at time t3, to the set rotational speed Non that permits load application, whereby the load L1 is applied to the generator. This load application causes an increase in the mechanical load applied to the engine 1 from the generator 2, and the idle rotational speed therefore decreases, but because an engine torque increases due to the opening degree of the ISC valve 7 being corrected towards opening, even though the load is applied at time t3, the idle rotational speed N does not dramatically decrease below the target idle rotational speed No and converges to the target rotational speed No in a short amount of time. After a process of increasing the opening degree of the ISC valve by the correction amount $\Delta\theta isc$ has been started at time t1, the process of correcting the target opening degree of the ISC valve is ended when a set amount of time Ts has elapsed and time t4 is reached, and the opening degree of the ISC valve is returned to the target opening degree $\theta iscf$ in idle control.

When the load drive command sent to the load application/cutoff control means 508 is nullified at time t5, load cutoff notification information serving as a notification that the load will be cut off is sent from the load application/cutoff control means 508 to the load fluctuation detection means 506, as shown in FIG. 8(A). The load fluctuation detection means 506 obtains, from this load cutoff notification information, information that the load L1 will be cut off, and detects that the load of the generator will decrease in proportion to the load L1; therefore, the target opening degree setting means 507 reduces the target opening degree sent to the valve operation means 505 to be less than the target opening degree $\theta iscf$ in idle control by the correction amount $\Delta\theta isc$ calculated according to the amount of decrease in the load, as shown in FIG. 8(B). The valve operation means 505 thereby reduces the opening degree of the ISC valve 7 to a corrected target opening degree $\theta iscf-\Delta\theta isc$, and the idle rotational speed N therefore decreases below the target rotational speed No after time t6, as shown in FIG. 8(C).

The load application/cutoff control means 508 nullifies the drive signal that had been sent to the switch SW1 and brings this switch into an OFF state when it has been confirmed that the idle rotational speed N has decreased to the set rotational speed Noff that permits the load to be cut off at time t7, whereby the load L1 is cut off. This load cutoff causes a lightening of the mechanical load applied to the engine 1 from the generator 2, and the idle rotational speed therefore increases after time t7, but because the engine torque decreases due to the opening degree of the ISC valve 7 being corrected towards closing, the idle rotational speed N does not dramatically increase above the target idle rotational speed No, and converges to the target rotational speed No in a short amount of time. After a process of reducing the opening degree of the ISC valve by the correction amount $\Delta\theta isc$ has been started at time t5, the process of correcting the target opening degree of the ISC valve is ended when the set amount of time Ts has elapsed and time t8 is reached, and the opening degree of the ISC valve is returned to the target opening degree $\theta iscf$ in idle control.

The magnitude of the correction amount $\Delta\theta isc$ of the opening degree of the ISC valve and the amount of time (correction amount of time) Ts for performing the process of correcting the opening degree of the ISC valve may differ between when the load of the generator has increased and when the load has decreased, and the magnitude of the correction amount $\Delta\theta isc$ and (or) the amount of time Ts for performing the correction process may be the same between when the load of the generator has increased and when the load has decreased. The correction amount and the amount of time for performing the correction process are appropriately set on the basis of experimentation results.

In the above description, the target opening degree setting means 507 is configured so that when a fluctuation in the load of the generator has been detected, the corrected target opening degree is sent as the target opening degree to the valve operation means during the set amount of time, after which the target opening degree sent to the valve operation means is returned to the idle-control target opening degree. However, in order to perform the process of correcting the target opening degree of the ISC valve 7 for only a limited amount of time, the target opening degree setting means 507 may be configured so that after the corrected target opening degree has been sent as the target opening degree to the valve operation means when a load fluctuation is detected, the target opening degree sent to the valve operation means is returned to the idle-control target opening degree when a state is established indicating that the idle rotational speed has converged on the target value.

Figure 9:
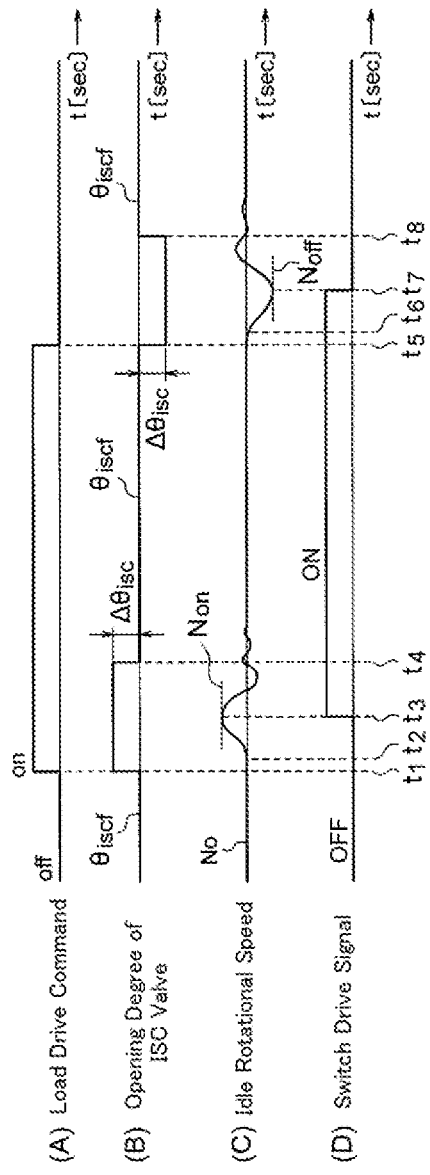
FIG. 9 is another timing chart used to describe actions of an embodiment of the present invention.

Referring to FIG. 9, a time chart depicts actions for controlling the ISC valve, the actions being performed when the target opening degree setting means 507 is configured in this manner. In the example shown in FIG. 9, the load drive command is sent to the load application/cutoff control means 508 at time t1 as shown in (A), and load application notification information serving as a notification that the load L1 will be applied is therefore sent from the load application/cutoff control means 508 to the load fluctuation detection means 506. The load fluctuation detection means 506 obtains, from this information, information that the load L1 will be applied, and detects that the load of the generator will increase in proportion to the load L1. Therefore, the target opening degree setting means 507 causes the target opening degree sent to the valve operation means 505 to increase above the target opening degree $\theta iscf$ in idle control by the correction amount $\Delta\theta isc$ calculated according to the amount of increase in the load, as shown in FIG. 9(B). The valve operation means 505 thereby causes the opening degree of the ISC valve 7 to increase to the corrected target opening degree $\theta iscf+\Delta\theta isc$, and the idle rotational speed N therefore increases above the target rotational speed No after time t2 occurring later than time t1, as shown in FIG. 9(C).

The load application/cutoff control means 508 sends an application command to the switch SW1 and brings this switch into an ON state when it has been confirmed that the idle rotational speed N has increased to the set rotational speed Non that permits load application at time t3, whereby the load L1 is applied. This load application causes an increase in the mechanical load applied to the engine 1 from the generator 2, and the idle rotational speed therefore decreases, but because the engine torque increases due to the opening degree of the ISC valve 7 being corrected towards opening, even though the load is applied at time t3, the idle rotational speed N does not dramatically decrease below the target idle rotational speed No and converges to the target rotational speed No in a short amount of time. When, at time t4, a state is established indicating that the idle rotational speed has converged on the target rotational speed No, the target opening degree setting means 507 ends the process of correcting the target opening degree of the ISC valve and returns the opening degree of the ISC valve to the target opening degree $\theta iscf$ in idle control.

When the load drive command sent to the load application/cutoff control means 508 is nullified at time t5 as shown in FIG. 9(A), the load cutoff notification information serving as a notification that the load L1 will be cut off is sent from the load application/cutoff control means 508 to the load fluctuation detection means 506. The load fluctuation detection means 506 obtains, from this load cutoff notification information, information that the load L1 will be cut off and detects that the load of the generator will decrease in proportion to the load L1; therefore, the target opening degree setting means 507 causes the target opening degree sent to the valve operation means 505 to decrease below the target opening degree θiscf in idle control by the correction amount Δθisc calculated according to the amount of decrease in the load, as shown in FIG. 9(B). The valve operation means 505 thereby causes the opening degree of the ISC valve 7 to decrease to the corrected target opening degree θiscf−Δθisc, and the idle rotational speed N therefore decreases below the target rotational speed No after time t6 occurring later than time t5 by a fixed amount of time, as shown in FIG. 9(C).

The load application/cutoff control means 508 nullifies the drive signal that had been sent to the switch SW1 and brings this switch into an OFF state when a confirmation is made that the idle rotational speed N has decreased to the set rotational speed Noff that permits the load to be cut off at time t7, whereby the load L1 is cut off. This load cutoff causes a lightening of the mechanical load applied to the engine 1 from the generator 2, and the idle rotational speed therefore increases after time t7, but because the engine torque decreases due to the opening degree of the ISC valve 7 being corrected towards closing, even though the load is cut off at time t7, the idle rotational speed N does not dramatically increase above the target idle rotational speed No and converges to the target rotational speed No in a short amount of time. When, at time t8, a state is established indicating that the idle rotational speed has converged on the target value, the target opening degree setting means 507 ends the process of correcting the target opening degree of the ISC valve and returns the opening degree of the ISC valve to the target opening degree θiscf in idle control.

In the above description, the load fluctuation detection means 506 acquires, from the load application/cutoff control means 508, information that a load will be applied and information that the load will be cut off and detects fluctuation in the load of the generator. However, in the present embodiment, the load fluctuation detection means 506 is configured so as to detect that the load of the generator has fluctuated upon detecting that the voltage between the output terminals 3 has exhibited a set voltage decrease and also upon detecting that the voltage between the output terminals 3 has exhibited a set voltage increase.

In cases in which a battery is connected between the output terminals 3, when an electrical load is connected between the output terminals during idling, a battery voltage exhibits a steep voltage decrease due to a current flowing from the battery to the electrical load, and when the electrical load is disconnected from between the output terminals, the battery voltage exhibits a steep voltage increase. Therefore, when a battery is connected between the output terminals 3, it is possible to detect that an electrical load has been applied to the generator because a predetermined voltage decrease has occurred in the voltage between the output terminals, and it is possible to detect that the electrical load has been cut off from the generator because a predetermined voltage increase has occurred in the voltage between the output terminals.

After the voltage between the output terminals 3 has decreased due to the application of the load of the generator 2, there is a delay until the idle rotational speed of the engine begins to decrease, and after the voltage between the output terminals 3 has increased due to the cutting off of the load, there is a delay until the idle rotational speed begins to increase. Therefore, when a fluctuation in the load of the generator is detected from a change in the voltage between the output terminals, the engine torque can, even by correcting the opening degree of the ISC valve, be increased or reduced in order to minimize a fluctuation in the idle rotational speed before the fluctuation in the idle rotational speed has begun, and the fluctuation in the idle rotational speed can be effectively minimized.

To detect fluctuations in the load of the generator from changes in the voltage between the output terminals, the load fluctuation detection means 506 is provided with a sampling means that samples the voltage between the output terminals 3 in a set sampling cycle and with a voltage change amount detection means that detects an amount of change in the voltage between the output terminals by determining a difference between a voltage newly sampled by the sampling means and a voltage sampled in a previous cycle. The load fluctuation detection means 506 is configured so as to detect that a fluctuation that requires a correction of the opening degree of the ISC valve has occurred in the load of the generator when the voltage change amount detected by the voltage change amount detection means is equal to or greater than a set value. When the load fluctuation detection means 506 has detected a fluctuation in the load of the generator from the change in the output voltage, the correction amount calculation means 513 calculates an amount for correcting the opening degree of the ISC valve in accordance with the amount of change (the extent of change) in the voltage. The target opening degree setting means 507 calculates a corrected target opening degree by correcting the idle-control target opening degree calculated by the means 512 for calculating the idle-control target opening degree, the idle-control target opening degree being corrected by the correction amount calculated by the correction amount calculation means 513, and sends the corrected target opening degree as the target opening degree to the valve operation means 505.

Figure 11:
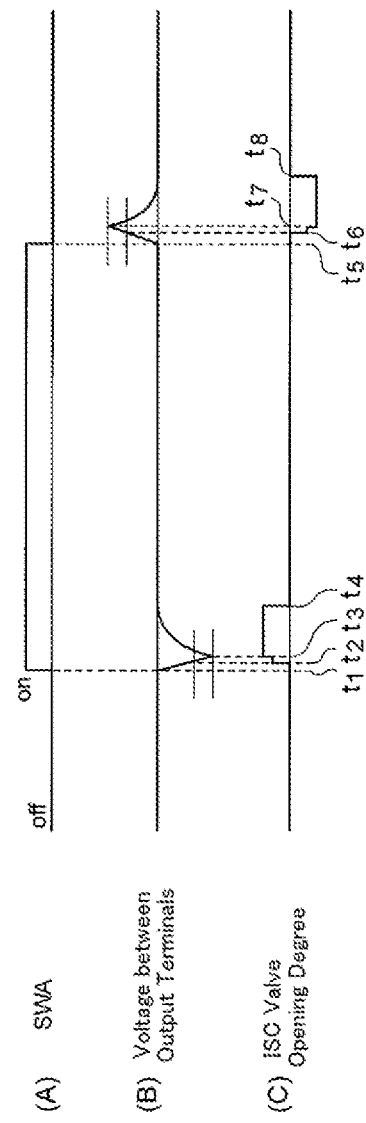
FIG. 11 is a timing chart depicting actions performed when an electrical load is applied to a generator and when the electrical load is cut off from the generator while a battery is connected between output terminals to which an electrical load of a magneto AC generator is connected in an embodiment of the present invention.

FIG. 11 is a time chart depicting actions for controlling the ISC valve in a case in which fluctuation in the load of the generator is detected when a decrease or increase in the voltage between the output terminals 3 has been detected. In the example shown in FIG. 11, the switch SWA of FIG. 1 is put in an ON state at time t1 as shown in (A), the load LA is applied, and the voltage between the output terminals 3 therefore decreases as shown in FIG. 11(B). From an amount of decrease in the voltage between the output terminals at the time 2, the load fluctuation detection means 506 detects that a fluctuation requiring a correction of the opening degree of the ISC valve has occurred in the load of the generator 2, and the correction amount calculation means 513 therefore calculates a correction amount for the opening degree of the ISC valve, this correction amount being needed to minimize a fluctuation in the idle rotational speed occurring due to this load fluctuation. The target opening degree setting means 507 sends a corrected target opening degree as the target opening degree to the valve operation means 505, and the opening degree of the ISC valve is therefore corrected at time t2 as shown in FIG. 11(C), the corrected target opening degree being the idle-control target opening degree corrected by the calculation amount. In the example shown in FIG. 11, the load fluctuation detection means 506 detects, from the amount of the decrease in the voltage between the output terminals, that a fluctuation requiring further correction of the opening degree of the ISC valve has occurred in the load of the generator 2 at time t3, and the opening degree of the ISC valve is therefore further corrected at time t3.

In the example shown in FIG. 11, the switch SWA is opened and the load LA is cut off from the generator 2 at time t5, and the voltage between the output terminals therefore increases. The load fluctuation detection means 506 detects, from an amount of this increase in the voltage between the output terminals, that a fluctuation requiring correction of the opening degree of the ISC valve has occurred in the load of the generator 2 at time t6, and causes the correction amount calculation means 513 to calculate a correction amount for the opening degree of the ISC valve, this correction amount being needed to minimize a fluctuation in the idle rotational speed that occurs due to this load fluctuation, and the opening degree of the ISC valve is therefore corrected at time t6 as shown in FIG. 11(C). From an amount of the decrease in the voltage between the output terminals at time t7, the load fluctuation detection means 506 detects that a fluctuation requiring further correction of the opening degree of the ISC valve has occurred in the load of the generator 2, and the opening degree of the ISC valve is therefore further corrected at time t7.

Figure 12:
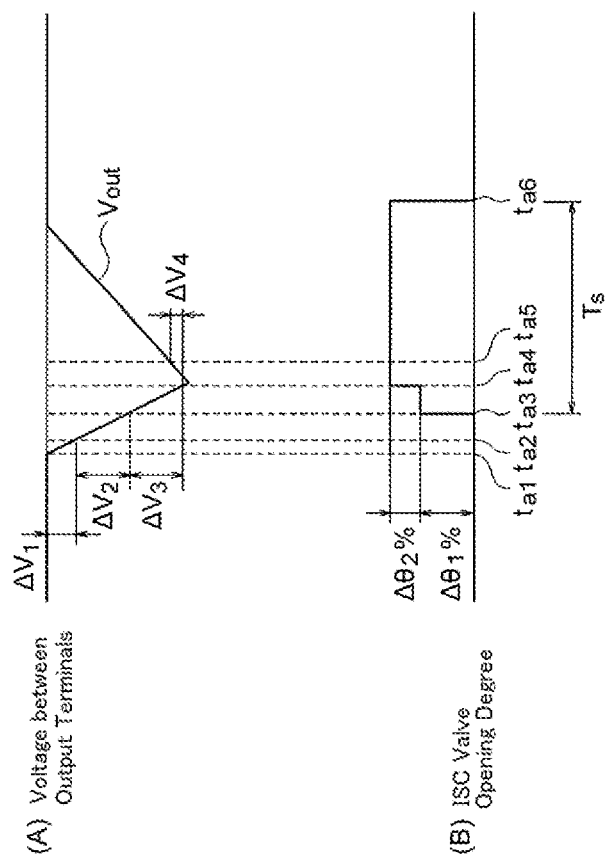
FIG. 12 is a waveform chart schematically depicting a change in voltage between the output terminals and a change in an opening degree of an ISC valve, these changes occurring when the load is applied to the generator while the battery is connected between the output terminals to which the load of the magneto AC generator is connected in an embodiment of the present invention.
Figure 13:
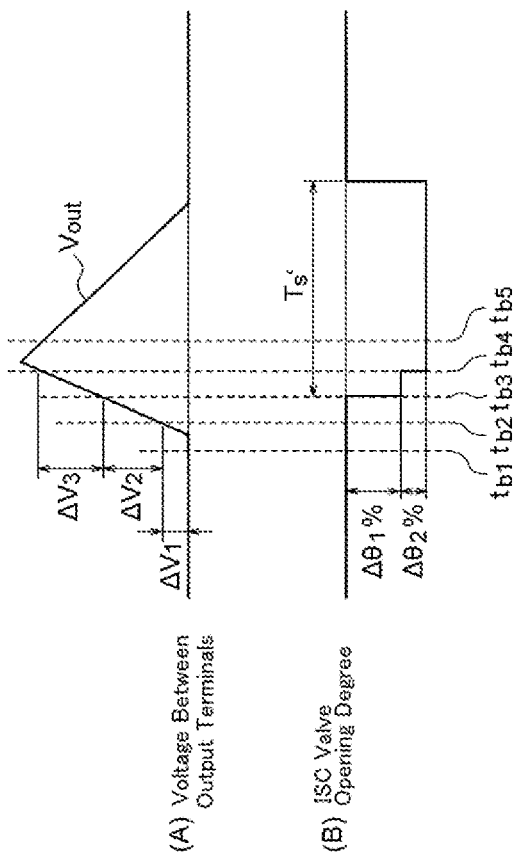
FIG. 13 is a waveform chart schematically depicting a change in voltage between the output terminals and a change in an opening degree of an ISC valve, these changes occurring when the load is cut off from the generator while the battery is connected between the output terminals to which the load of the magneto AC generator is connected in an embodiment of the present invention.

The load fluctuation detection means 506 depicted in the present embodiment samples the voltage between the output terminals to detect a load fluctuation, and FIGS. 12 and 13 show timing charts depicting examples of actions of a process by which the opening degree of the ISC valve is corrected with respect to the detected load fluctuation.

FIG. 12 shows an action performed when any of the switches SWA-SWN are applied and the load of the generator 2 has increased. In this example, the sampling means samples the voltage between the output terminals 3 at times ta1, ta2, etc. A difference ΔV1 between a voltage value sampled at time ta1 and a voltage value sampled at time ta2 has not reached a set value; therefore, the load fluctuation detection means 506 does not determine, due to this voltage change, that a load fluctuation requiring correction of the opening degree of the ISC valve has occurred. At a next sampling time ta3, an amount ΔV2 of change from the voltage sampled at the previous sampling time ta2 is determined to be equal to or greater than a set value; therefore, the load fluctuation detection means 506 determines that a load fluctuation requiring correction of the opening degree of the ISC valve has occurred, and causes the correction amount calculation means 513 to calculate a correction amount for the opening degree of the ISC valve, this correction amount being needed to minimize a fluctuation in the idle rotational speed occurring due to the load fluctuation. The opening degree of the ISC valve is thereby corrected by Δθ1% at time ta3. At a sampling time ta4 as well, an amount ΔV3 of change from the voltage sampled at the previous sampling time ta3 is determined to be equal to or greater than the set value; therefore, the load fluctuation detection means 506 determines that a load fluctuation requiring correction of the opening degree of the ISC valve has occurred, and causes the correction amount calculation means 513 to calculate a correction amount for the opening degree of the ISC valve, this correction amount being needed to minimize a fluctuation in the idle rotational speed occurring due to the load fluctuation. The opening degree of the ISC valve is thereby corrected by Δθ2% at time ta4.

FIG. 13 shows an action performed when any of the switches SWA-SWN are changed from an applied state to a cutoff state and the load of the generator 2 has decreased. In this example, the sampling means samples the voltage between the output terminals 3 at times tb1, tb2, etc. A difference ΔV1 between a voltage value sampled at time tb1 and a voltage value sampled at time tb2 has not reached a set value; therefore, the load fluctuation detection means 506 does not determine, due to this voltage change, that a load fluctuation requiring correction of the opening degree of the ISC valve has occurred. At a next sampling time tb3, an amount ΔV2 of change from the voltage sampled at the previous sampling time tb2 is determined to be equal to or greater than a set value; therefore, the load fluctuation detection means 506 determines that a load fluctuation requiring correction of the opening degree of the ISC valve has occurred, and causes the correction amount calculation means 513 to calculate a correction amount for the opening degree of the ISC valve, this correction amount being needed to minimize a fluctuation in the idle rotational speed occurring due to the load fluctuation. The opening degree of the ISC valve is thereby corrected by Δθ1% at time tb3. At a sampling time tb4 as well, an amount ΔV3 of change from the voltage sampled at the previous sampling time tb3 is determined to be equal to or greater than the set value; therefore, the load fluctuation detection means 506 determines that a load fluctuation requiring correction of the opening degree of the ISC valve has occurred, and causes the correction amount calculation means 513 to calculate a correction amount for the opening degree of the ISC valve, this correction amount being needed to minimize a fluctuation in the idle rotational speed occurring due to the load fluctuation. The opening degree of the ISC valve is thereby corrected by Δθ2% at time tb4.

As described above, when load fluctuations in the generator are detected from changes in the voltage between the output terminals, it is possible to detect that a load has been applied to the generator and that the load has been cut off from the generator even when loads are applied and cut off without the application and cutting off being controlled by the electronic control unit 5, making it possible to perform the process of correcting the opening degree of the ISC valve for minimizing fluctuation in the idle rotational speed, even when loads are applied and cut off without the application and cutting off being controlled by the electronic control unit.

As described above, in the engine drive system of the present embodiment, when the load fluctuation detection means 506 has detected a fluctuation in the load (an application or cutting off of the load) of the generator 2 while the engine 1 is idling, a process of correcting the opening degree of the ISC valve is performed in order to minimize a fluctuation in the idle rotation that occurs along with the fluctuation in the load of the generator 2, but there will inevitably be a delay until the fluctuation in the idle rotational speed has begun after the load of the generator 2 has fluctuated. Therefore, when a measure is devised to correct the opening degree of the ISC valve when a load fluctuation of the generator 2 has been detected, the fluctuation in the idle rotational speed can be more effectively minimized in comparison with cases in which the idle rotational speed is controlled by feedback control alone.

Figure 10:
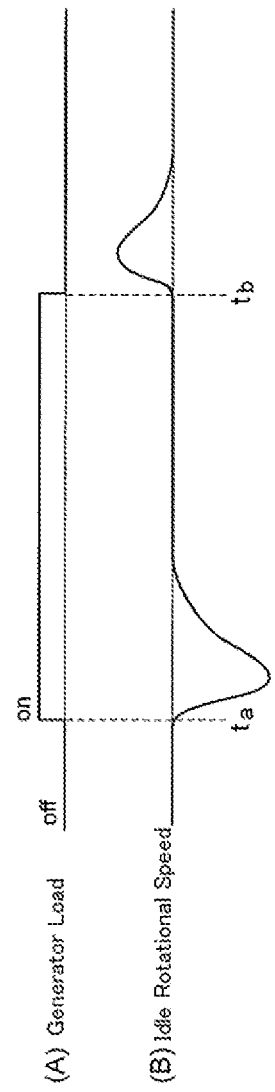
FIG. 10 is a timing chart used to describe actions of a prior-art engine drive system.

In the engine drive system described above, in cases in which a process of correcting the opening degree of the ISC valve in accordance with the extent of the load fluctuation is not performed when the load of the generator 2 has been applied or cut off, the idle rotational speed dramatically fluctuates as shown in FIG. 10(B) when the load of the generator is applied during idling at time to and when the load is cut off at time tb as shown in FIG. 10(A). In a worst case, the engine could stall when the load is applied. However, according to the present embodiment, when an electrical load is connected to the generator 2 during idling, there are no problems of significant fluctuation in the idle rotational speed or stalling of the engine 1, and an open-type regulator 4 can be used to adjust voltage.

When an open-type regulator is used and the engine idles while an electrical load is not connected to the generator, it is possible to ensure that a mechanical load is mostly not applied to the engine from the generator. Even while an electrical load is connected to the generator, the armature coil and the output terminals are electrically disconnected from each other during the time that the voltage between the output terminals exceeds a set value, and a current does not flow to the armature coil; accordingly, the mechanical load applied to the engine from the generator during voltage adjustment can be less than when a short-circuit-type regulator is used. Therefore, when an open-type regulator is used, less fuel can be consumed by the engine during idling than when a short-circuit-type regulator is used, and fuel consumption of the engine can be improved.

As in the embodiment described above, when at least one of the electrical loads of the generator 2 that is sometimes connected to the output terminals during idling of the engine 1 is designated as a controlled load L1-Ln for which connection to the output terminals and disconnection from the output terminals is controlled by the electronic control unit, it is preferable that the electrical load selected as the controlled load be an electrical load with which there is a risk of the engine rotational speed being reduced by at least a set rotational speed or of the engine being stalled when the electrical load is connected to the output terminals while the engine is idling and the generator is in a no-load state.

When the controlled loads L1-Ln are selected in this manner, it is possible to reliably sense a connection of an electrical load for which there is a risk of the engine rotational speed being dramatically reduced or of the engine being stalled when the electrical load is connected to the generator while the engine is idling, and to reliably know at an early stage that the idle rotational speed will decrease. The correction process of increasing the opening degree of the ISC valve can therefore be performed at an early stage, making it possible to reliably prevent the idle rotational speed from dramatically decreasing or the engine from stalling due to the connection of the electrical load.

In the embodiment shown in FIG. 1, the target opening degree setting means 507 is provided with the means 512 for calculating the idle-control target opening degree whereby the idle-control target opening degree is calculated, and is also provided with the correction amount calculation means 513 that calculates the amount to correct the opening degree of the ISC valve in accordance with the extent of the load fluctuation when a load fluctuation is detected, the target opening degree setting means 507 being configured so as to calculate a corrected target opening degree by using the correction amount calculated by the correction amount calculation means 513 and performing a corrective calculation on the idle-control target opening degree calculated by the means 512 for calculating the idle-control target opening degree. However, the target opening degree setting means 507 may be configured so that when a load fluctuation of the generator has been detected, the opening degree of the ISC valve is corrected in order to minimize fluctuation in the idle rotational speed by correcting the target idle rotational speed effective during feedback control of the idle rotational speed.

Figure 2:
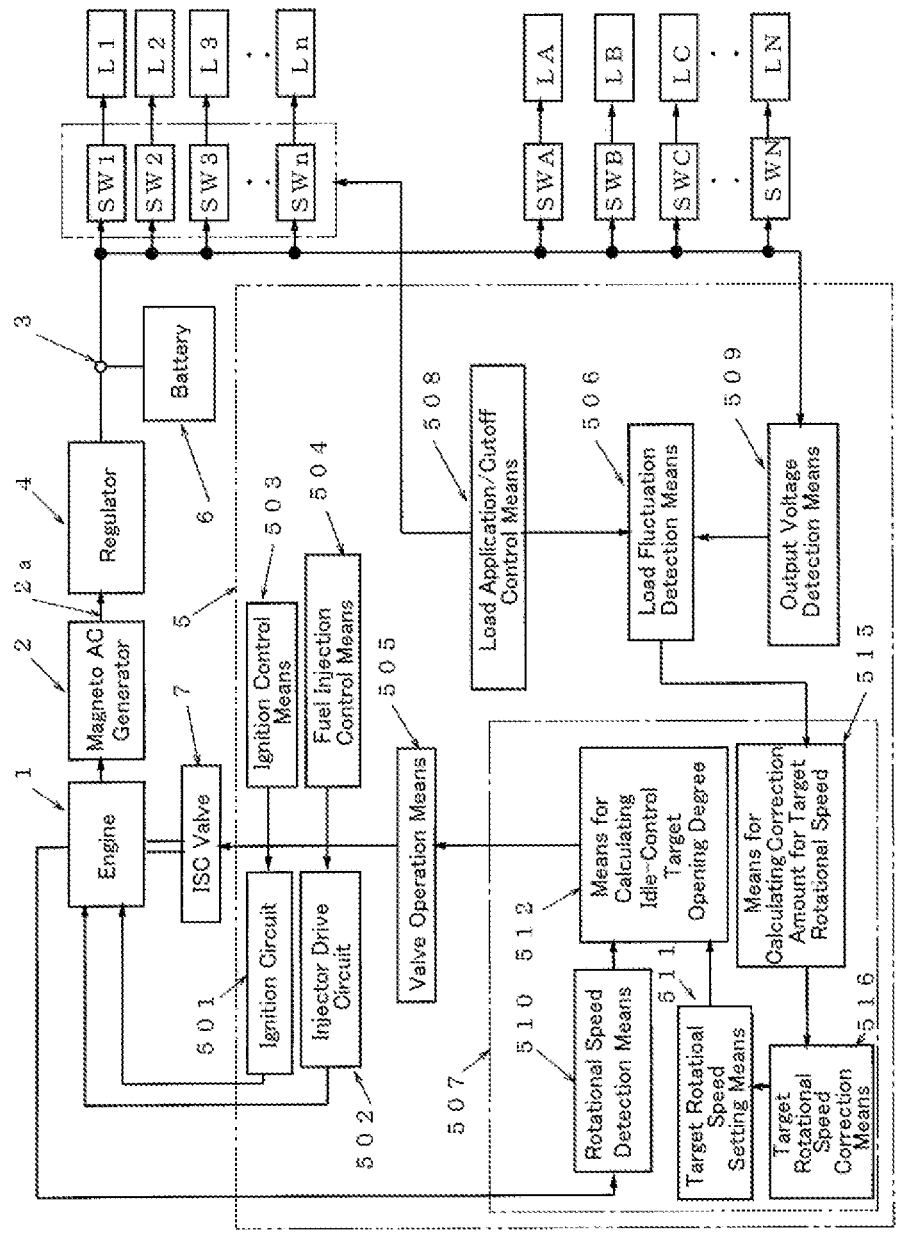
FIG. 2 is a block diagram showing a configuration of a principal part of a second embodiment of the present invention.

FIG. 2 is a block diagram showing the configuration of the system in a case in which, when a load fluctuation of the generator 2 has been detected, the opening degree of the ISC valve 7 is corrected by correcting the target idle rotational speed effective during feedback control of the idle rotational speed. In the example shown in FIG. 2, the system is configured such that when the load fluctuation detection means 506 has detected a load fluctuation of the generator 2, the opening degree of the ISC valve is corrected in order to minimize fluctuation in the idle rotational speed by correcting the target idle rotational speed effective during feedback control of the idle rotational speed. Specifically, the target opening degree setting means 507 used in the present embodiment is provided with the means 512 for calculating the idle-control target opening degree that uses the target value and detected value of the idle rotational speed as input and calculates the idle-control target opening degree needed to maintain the idle rotational speed at the target value, a means 515 for calculating a correction amount for the target rotational speed whereby the correction amount is calculated for the target value of the idle rotational speed needed to cause the means for calculating the idle-control target opening degree to calculate the corrected target opening degree when a load fluctuation has been detected, and a target rotational speed correction means 516 that corrects the target rotational speed set by the target rotational speed setting means 511 by the correction amount calculated by the means 515 for calculating a correction amount for the target rotational speed. The target opening degree setting means 507 is configured so that when a load fluctuation has been detected, the target rotational speed sent to the means 512 for calculating the idle-control target opening degree is corrected by the correction amount calculated by the means 515 for calculating the correction amount for the target rotational speed, whereby the means 512 for calculating the idle-control target opening degree is caused to calculate the corrected target opening degree. Another configuration of the embodiment shown in FIG. 2 is the same as the configuration of the embodiment shown in FIG. 1.

Figure 3:
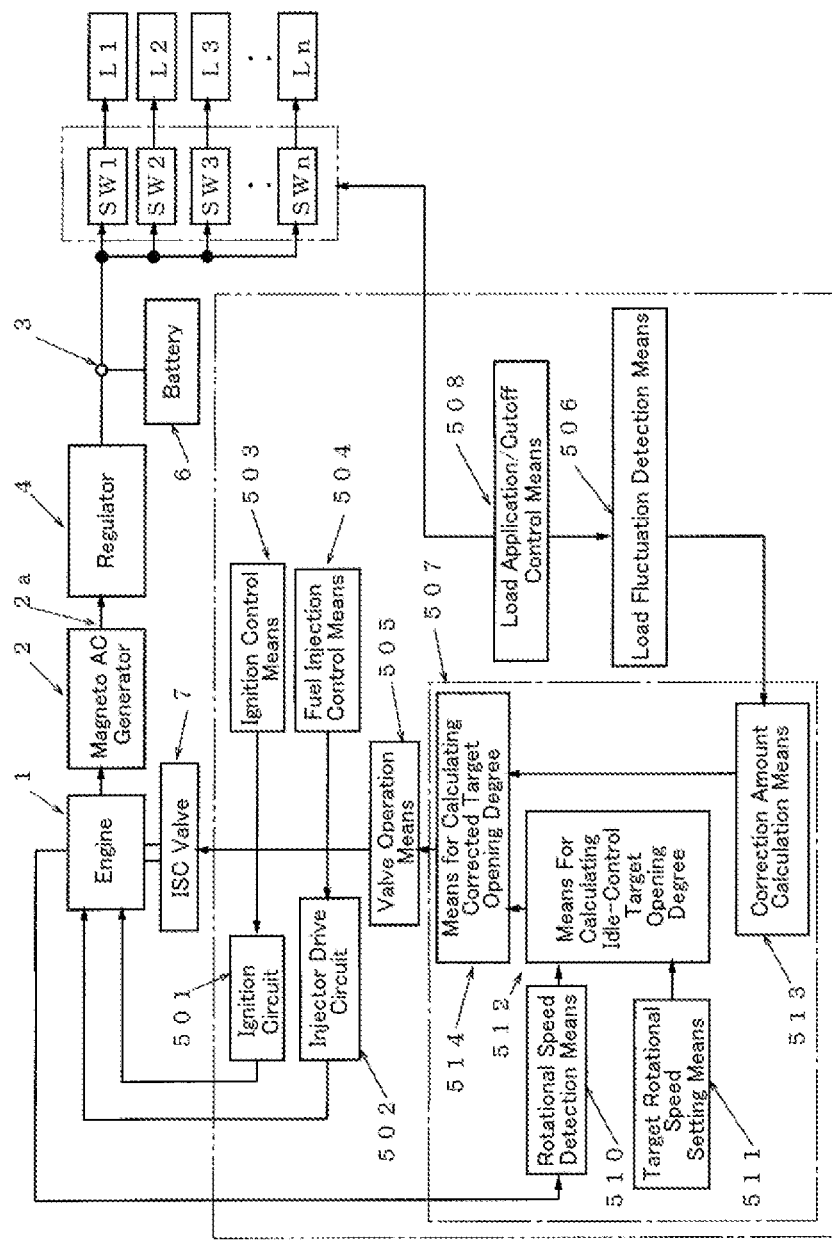
FIG. 3 is a block diagram showing a configuration of a principal part of a third embodiment of the present invention.

FIG. 3 shows a third embodiment of the present invention in which a part of the configuration of the first embodiment has been changed. In the present embodiment, the loads LA-LN shown in FIG. 1 are not provided, and only the controlled loads L1-Ln for which application and cutting off are controlled by the load application/cutoff control means 508 are provided. In the embodiment shown in FIG. 3, the output voltage detection means 509 provided in the first embodiment is omitted, and the load fluctuation detection means 506 is configured so as to detect the application and cutting off of the loads of the generator 2 from only the load application notification information and the load cutoff notification information sent from the load application/cutoff control means 508. The rest of the configuration of the embodiment shown in FIG. 3 is the same as the configuration of the embodiment shown in FIG. 1.

Figure 4:
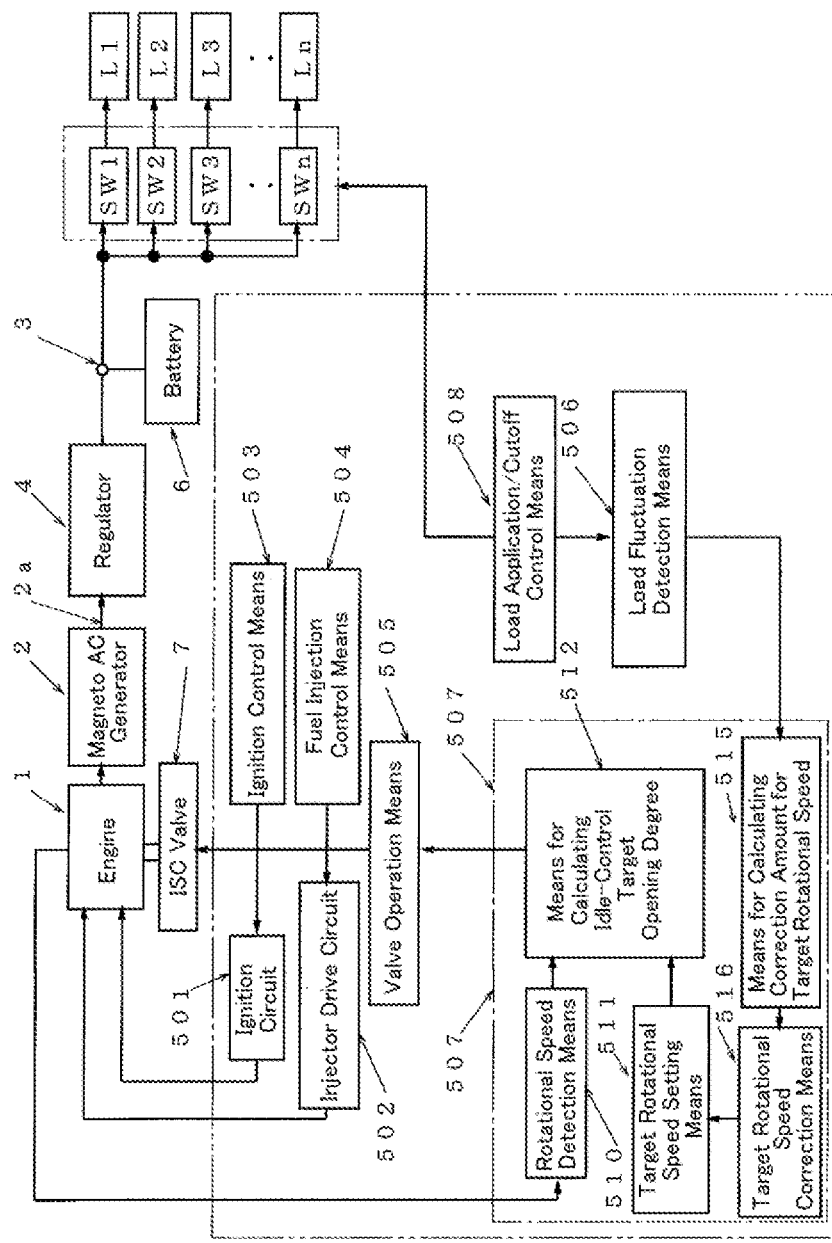
FIG. 4 is a block diagram showing a configuration of a principal part of a fourth embodiment of the present invention.

FIG. 4 shows a fourth embodiment of the present invention in which a part of the configuration of the embodiment shown in FIG. 2 has been changed. In the present embodiment, the loads LA-LN shown in FIG. 2 are not provided, and only the controlled loads L1-Ln for which application and cutting off are controlled by the load application/cutoff control means 508 are provided as loads applied to the generator 2. In the embodiment shown in FIG. 4, the output voltage detection means 509 provided in the embodiment of FIG. 1 is omitted, and the load fluctuation detection means 506 is configured so as to detect the application and cutting off of the loads of the generator 2 from only the load application notification information and the load cutoff notification information sent from the load application/cutoff control means 508. The rest of the configuration of the embodiment shown in FIG. 4 is the same as the configuration of the embodiment shown in FIG. 1.

Figure 5:
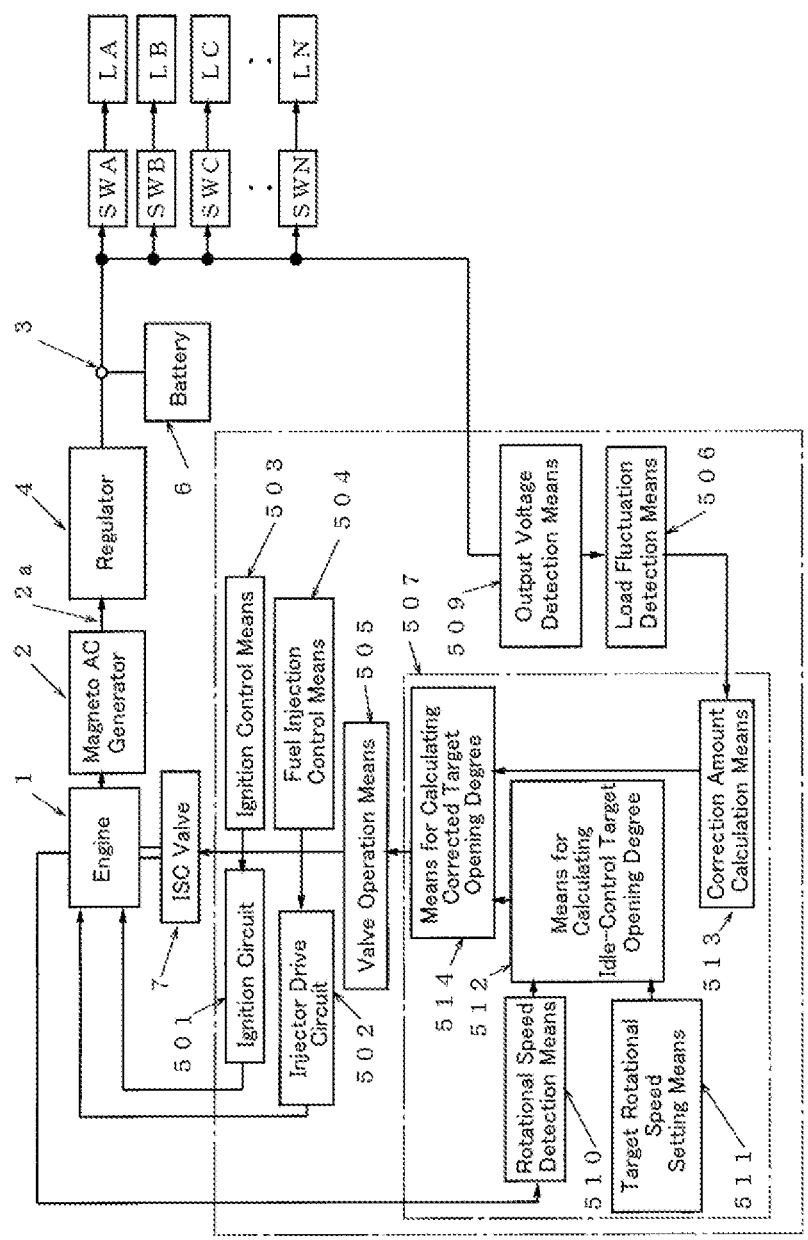
FIG. 5 is a block diagram showing a configuration of a principal part of a fifth embodiment of the present invention.

FIG. 5 shows a fifth embodiment of the present invention in which a part of the configuration of the embodiment shown in FIG. 1 has been changed. In the present embodiment, the controlled loads L1-Ln shown in FIG. 1 are not provided, and only the loads LA-LN not controlled by the electronic control unit are provided as loads applied to the generator 2. In the embodiment shown in FIG. 5, the load application/cutoff control means 508 provided in the embodiment of FIG. 1 is omitted, and the load fluctuation detection means 506 is configured so as to detect that the loads of the generator 2 have been applied and that the loads have been cut off, respectively, when a set voltage increase or a set voltage decrease in the voltage between the output terminals 3 has been detected by the output voltage detection means 509. The rest of the configuration of the embodiment shown in FIG. 5 is the same as the configuration of the embodiment shown in FIG. 1.

Figure 6:
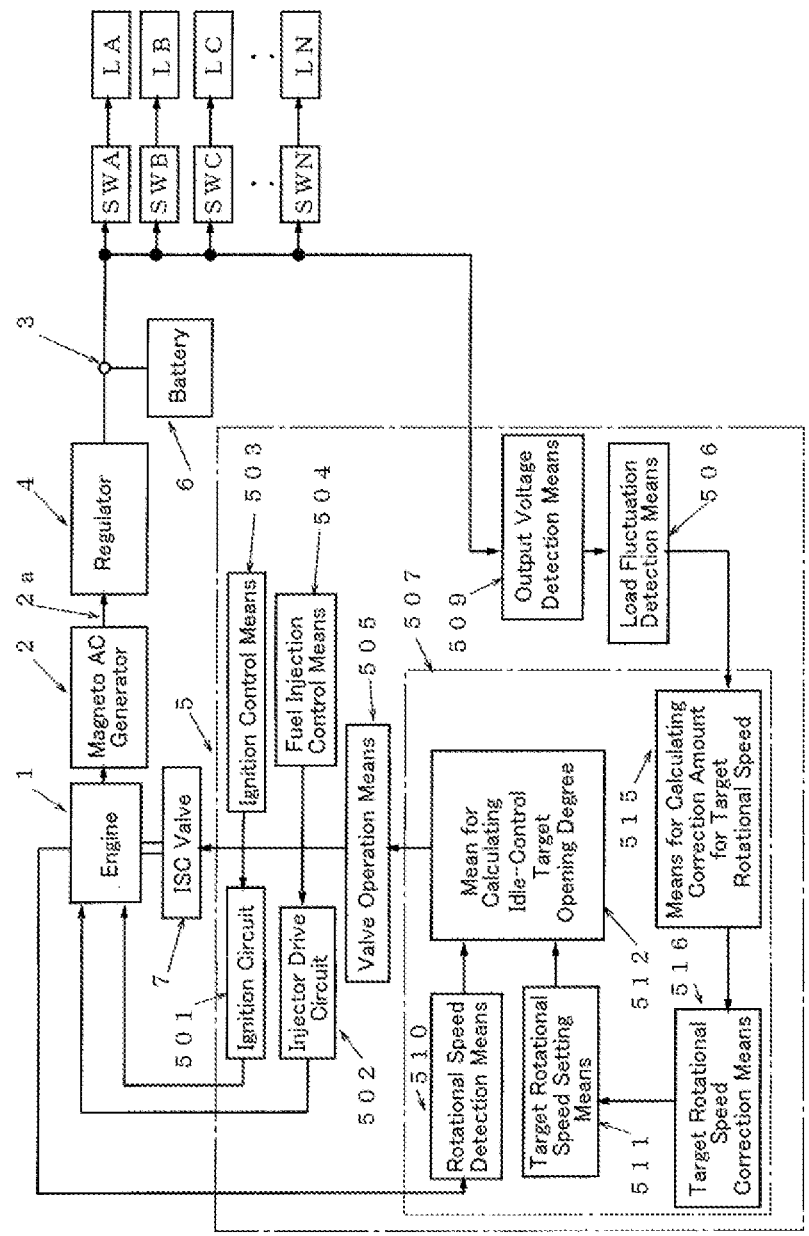
FIG. 6 is a block diagram showing a configuration of a principal part of a sixth embodiment of the present invention.

FIG. 6 shows a sixth embodiment of the present invention in which a part of the configuration of the embodiment shown in FIG. 2 has been changed. In the present embodiment, the controlled loads L1-Ln shown in FIG. 2 are not provided, and only the loads LA-LN for which load application and cutting off are not controlled by the load application/cutoff control means 508 are provided as loads applied to the generator 2. In the embodiment shown in FIG. 6, the load application/cutoff control means 508 provided in the embodiment of FIG. 2 is omitted, and the load fluctuation detection means 506 is configured so as to detect that the loads of the generator 2 have been applied and that the loads have been cut off, respectively, when a set voltage increase or a set voltage decrease in the voltage between the output terminals 3 has been detected by the output voltage detection means 509. The rest of the configuration of the embodiment shown in FIG. 6 is the same as the configuration of the embodiment shown in FIG. 2.

In the above description, decreases in the idle rotational speed occurring when a load is applied to the generator during idling are minimized, as are increases in the idle rotational speed occurring when the load that had been applied to the generator during idling is cut off, but it is not absolutely necessary that the system according to the present invention be configured so as to minimize both of these fluctuations in the idle rotational speed. For example, the system can be configured so as to focus on preventing engine stalling, which is the most critical problem occurring during idling in an engine drive system employing an open-type regulator, and to minimize only decreases in the idle rotational speed occurring when a load is applied to the generator during idling.

In the above description, the application and cutting off of the loads LA-LN for which application and cutting off are not controlled by the electronic control unit are detected from changes in the voltage between the output terminals 3, but the load fluctuation detection means 506 can also be configured so that sensors that detect the application and cutting off of the loads LA-LN (e.g., sensors that detect the ON/OFF states of the switches SWA-SWN) are provided and these sensors detect whether or not the loads LA-LN have been applied, thereby detecting whether the loads of the generator have been applied or cut off.

Figure 14:
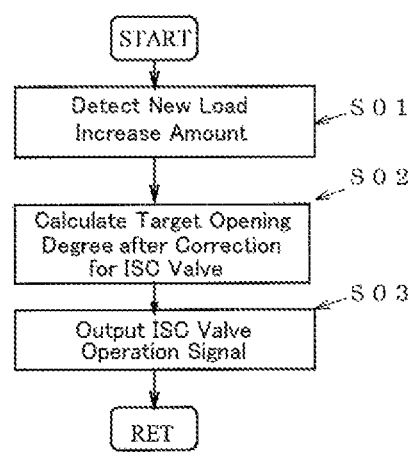
FIG. 14 is a general flowchart showing an overall flow of a program executed by a CPU of an electronic control unit in an embodiment of the present invention.
Figure 15:
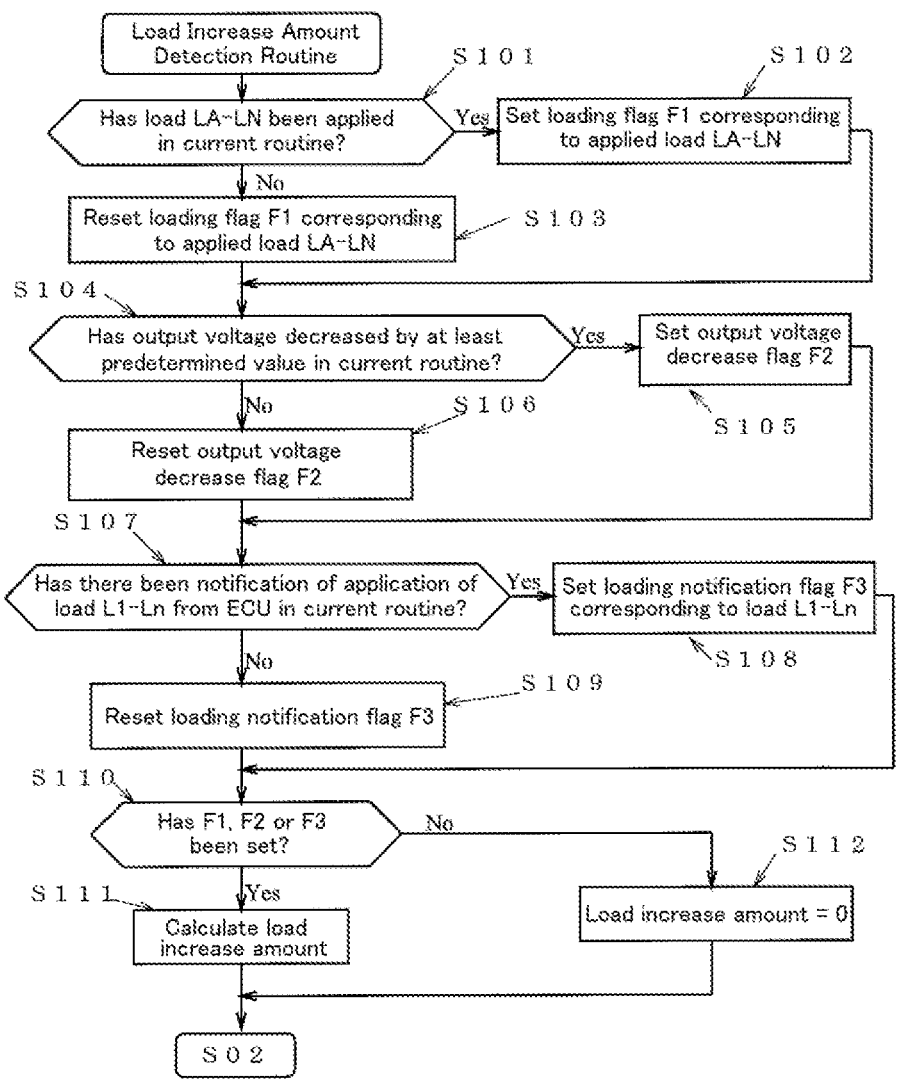
FIG. 15 is a flowchart showing an example of an algorithm of a load increase amount detection routine of the program executed by the CPU of the electronic control unit in an embodiment of the present invention.
Figure 16:
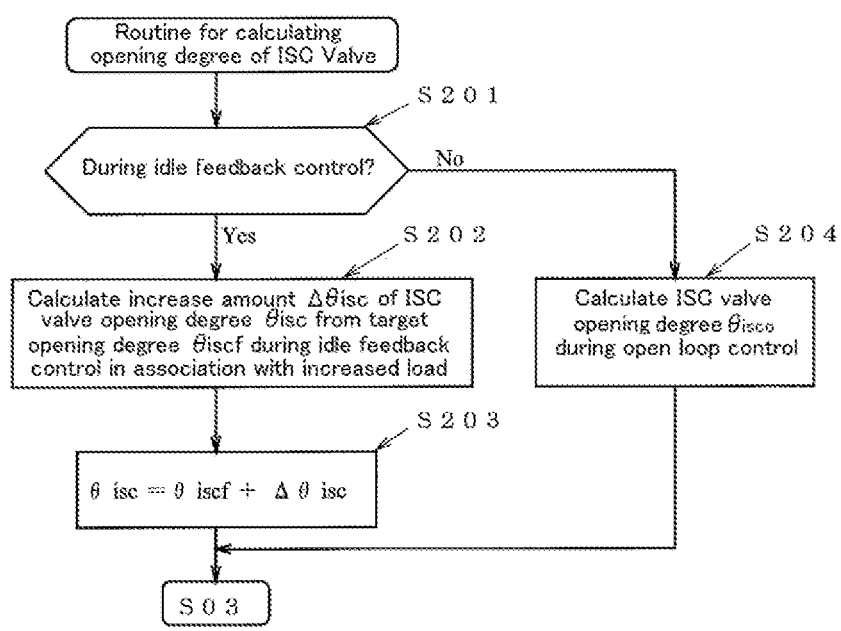
FIG. 16 is a flowchart showing an example of an algorithm in a routine for calculating an opening degree of an ISC valve in the program executed by the CPU of the electronic control unit in an embodiment of the present invention.
Figure 17:
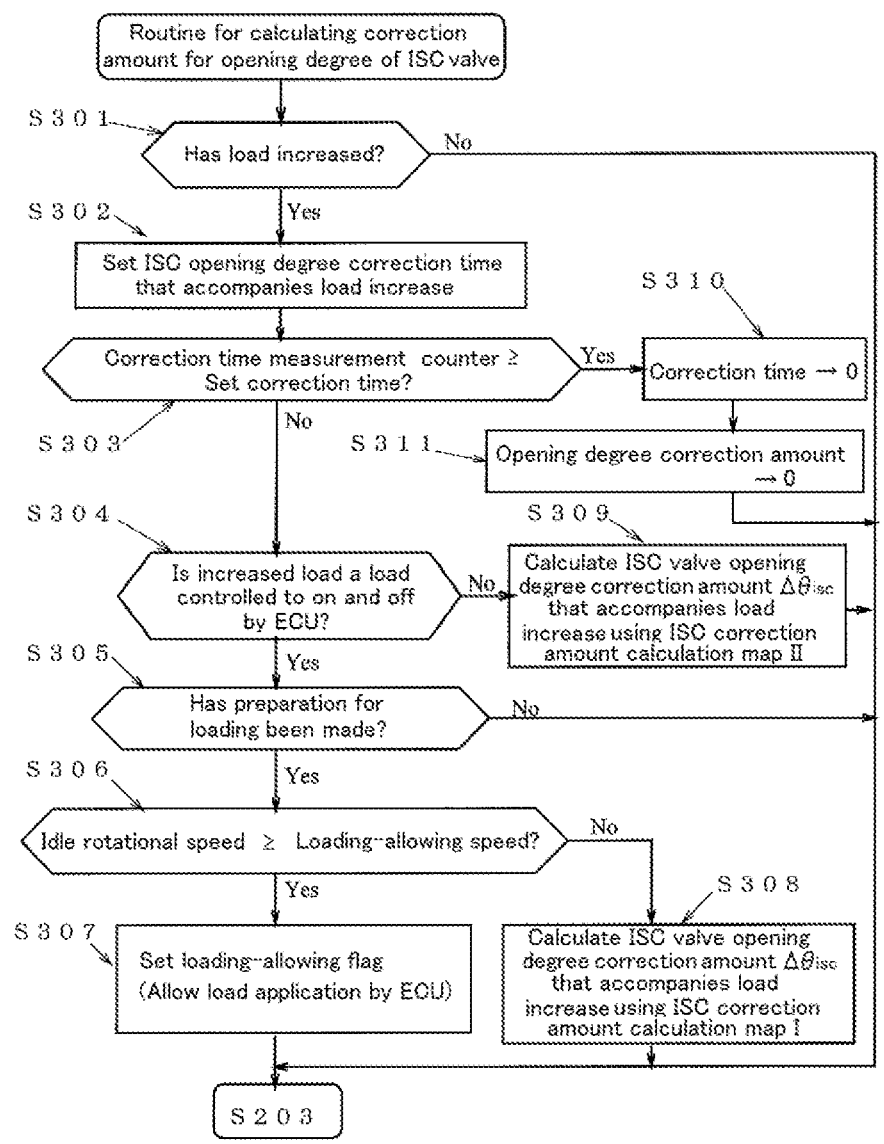
FIG. 17 is a flowchart showing an example of an algorithm in a routine for calculating a correction amount for an opening degree of an ISC valve in the program executed by the CPU of the electronic control unit in an embodiment of the present invention.

FIGS. 14 to 17 show flowcharts depicting an example of an algorithm of a program executed by the CPU of the electronic control unit 5 in the embodiment shown in FIG. 1, in a case in which the system is configured with the purpose of preventing an engine stall or a decrease in idle rotational speed occurring when a load is applied to the generator during idling. Among these charts, FIG. 14 is a general flowchart showing an overall flow of the program, and FIG. 15 is a flowchart showing an example of an algorithm of a load increase amount detection routine that detects an increase amount in the load of the generator. FIG. 16 is a flowchart showing an example of an algorithm in a routine for calculating an opening degree of an ISC valve whereby the correction amount of the target opening degree of the ISC valve and a corrected target opening degree are calculated, and FIG. 17 is a flowchart showing an example of an algorithm in a routine for calculating a correction amount for an opening degree of an ISC valve whereby the correction amount (degree of increase) for the opening degree of the ISC valve is calculated. In the present embodiment, sensors that detect the application and cutting off of the loads LA-LN (sensors that detect the states of the switches SWA-SWN) are provided, and it is possible to separately detect that the loads LA-LN have been applied and that the loads have been cut off.

In a case in which the system is configured with the purpose of preventing an engine stall or a decrease in idle rotational speed occurring when a load is applied to the generator during idling, after a newly occurring increase amount in the load of the generator during idling has been detected in step S01, a corrected target opening degree for the ISC valve is calculated in step S02, and an ISC valve operation signal sent to the valve operation means 505 is then outputted in step S03, as shown in FIG. 14.

In step S01 of FIG. 14, the increase amount in the load of the generator occurring during idling is detected by executing the load increase amount detection routine shown in FIG. 15. In the load increase amount detection routine shown in FIG. 15, first, in step S101, a determination is made as to whether or not any of the loads LA-LN have been applied (whether or not any of the load-applying switches SWA-SWN have been applied) in the current routine. As a result, when some of the loads LA-LN are determined to have been applied, the process advances to step S102, and a load application flag F1 corresponding to the applied load of the loads LA-LN is set.

When it is determined in step S101 that none of the loads LA-LN have been applied, the process advances to step S103 and the flag F1 is reset. After step S102 or S103 has been executed, the process advances to step S104, a determination is made as to whether or not the output voltage (the voltage between the output terminals) has decreased by at least a predetermined value in the current routine, and when it is determined that the output voltage has decreased by at least a predetermined value, the process advances to step S105, and an output voltage decrease flag F2 is set.

When it is determined in step S104 that the output voltage has not exhibited a decrease of at least the predetermined value in the current routine, the process advances to step S106 and the output voltage decrease flag is reset. After step S105 or S106 has been executed, the process advances to step S107, a determination is made as to whether or not there has been a load application notification from the load application/cutoff control means 508 of the electronic control unit (ECU) in the current routine, and when there has been a load application notification, the process advances to step S108 and a load application notification flag F3 is set, this flag corresponding to the load for which the notification of application was given among the controlled loads L1-Ln.

When it is determined in step S107 that there has not been a load application notification, the process advances to step S109 and the load application notification flag is reset. After step S109 has been executed, the process advances to step S110, a determination is made as to whether or not any of the flags F1, F2, or F3 has been set, and when a flag has been set, the process advances to step S111 and a load increase amount is calculated in accordance with the set flag. When it is determined in step S110 that none of the flags has been set, the load increase amount is designated as zero in step S112, this routine is ended, and the process advances to step S02 of FIG. 14.

The flag F1 is set when at least one of the loads LA-LN has been applied and is reset when the loads LA-LN have not been applied. The flag F2 is set when some of the loads LA-LN and loads L1-Ln have been applied and the voltage between the output terminals 3 has decreased by at least the predetermined value, and is reset when the voltage between the output terminals does not decrease by at least the predetermined value even if some of the loads LA-LN and loads L1-Ln have been applied. The flag F3 is set when some of the loads L1-Ln have been applied and is reset when the loads L1-Ln have not been applied.

In step S111 of FIG. 15, a determination is made from the flags that have been set as to whether or not any of the loads have been applied, and the load increase amount is calculated by adding the loads determined to have been applied. For example, when only the flag F1 has been set and the flag F2 has not been set, it is determined that at least one of the loads LA-LN will hereinafter be applied, and the magnitude of the load corresponding to the set flag F1 among the loads LA-LN is designated as the increase amount of the load. When both the flags F1 and F2 have been set and the flag F3 has not been set, it is determined that some of the loads LA-LN have been applied and a load current is actually flowing to the generator, and when it is determined from the extent of the decrease in the output voltage that the applied load is the load corresponding to the set flag F1 among the loads LA-LN, the magnitude of the load corresponding to the set flag F1 is designated as the increase amount of the load. When it is determined from the extent of the decrease in the output voltage (e.g., the amount of decrease per unit time) that there is an applied load in addition to the load corresponding to the set flag F1 among the loads LA-LN, the sum total of the magnitude of the load corresponding to the set flag F1 among the loads LA-LN and an estimated value of the load calculated by using a map in accordance with the extent of the decrease in the output voltage is designated as the increase amount of the load.

When only the flag F2 has been set, a load is applied for which no means are provided to directly detect application and cutting off of loads other than the loads LA-LN and L1-Ln. It is thereby determined that the output voltage has decreased, and an estimated value of the load calculated by mapping in accordance with the extent of the decrease in the output voltage is designated as the load increase amount. When only the flag F3 has been set, it is determined that some of the loads L1-Ln will be applied hereinafter, and the magnitude of the load corresponding to the set flag F3 among the loads L1-Ln is designated as the load increase amount.

When both the flags F1 and F3 have been set, the sum total value of the magnitude of the load corresponding to the set flag F1 among the loads LA-LN and the magnitude of the load corresponding to the set flag F3 among the loads L1-Ln is designated as the load increase amount.

After the increase amount of the load has been calculated in step S111 of FIG. 15, the process advances to step S02 of FIG. 14, and a corrected target opening degree that will serve as the opening degree of the ISC valve is calculated.

In step S02 of FIG. 14, the corrected target opening degree that will serve as the opening degree of the ISC valve is calculated by executing the routine for calculating the opening degree of the ISC valve as in FIG. 16.

In the routine of FIG. 16, a determination is first made in step S201 as to whether or not a current control mode is an idle feedback control mode. After the engine has been started, the opening degree of the ISC valve is controlled in a normal open loop until idle rotation stabilizes (e.g., while the engine is cooling and a warm-up operation is being performed). In open loop control, the opening degree of the ISC valve is set relative to a temperature of the engine and the like, and an operation signal is sent to the valve operation means 505 so that the opening degree of the ISC valve will be brought to the set target opening degree. After the temperature of the engine has reached a set value and idle rotation has stabilized, the routine transitions to feedback control, and undergoes feedback control of the opening degree of the ISC valve so that the idle rotational speed is maintained at a target speed.

When it is determined in step S201 of the routine of FIG. 16 that the current control mode is the idle feedback control mode, the process advances to step S202, a calculation is then made of the increase amount (correction amount) $\Delta\theta isc$ in the opening degree $\theta isc$ of the ISC valve accompanying the increase in the load of the generator, the process advances to step S203, and the corrected target opening degree $\theta isc=\theta iscf+\Delta\theta isc$ is calculated. The increase amount $\Delta\theta isc$ is an increase from the target opening degree $\theta iscf$ in idle control, which is the target opening degree of the ISC valve during feedback control.

When it is determined in step S201 of the routine of FIG. 16 that the current control mode is not the idle feedback control mode but is an open loop control mode, the process advances to step S204, and a target opening degree $\theta isco$ of the ISC valve in effect when open loop control is performed is calculated using a map. The map used in this calculation is, for example, is a map that gives a relationship between the rotational speed of the engine, the temperature of the engine, and the target opening degree of the ISC valve.

In step S202 of the routine of FIG. 16, the amount (correction amount) by which the target opening degree of the ISC valve increases from the target opening degree $\theta iscf$ in idle control is calculated by executing the routine for calculating the correction amount for the opening degree of the ISC valve as in FIG. 17. In the routine for calculating the increase amount in the opening degree of the ISC valve as in FIG. 17, a determination is first made in step S301 as to whether or not the load of the generator 2 has increased, and when it is determined that the load has not increased, this process is ended with nothing else being done. When it is determined in step S301 that the load has increased, the process advances to step S302, and an ISC valve opening degree correction time is set. The correction time is a time during which a process of correcting the opening degree of the ISC valve is performed along with the increase in the load of the generator 2. The correction time thus set is then set into a correction time measurement counter, and measurement is initiated. The process then advances to step S303, and a determination is made as to whether or not a value measured by the correction time measurement counter is equal to or greater than the set correction time. As a result, when it is determined that the value measured by the correction time measurement counter is less than the set correction time, the process advances to step S304 and a determination is made as to whether or not the increased load is a load for which application and cutting off are controlled by the electronic control unit 5.

When it is determined in step S304 that the increased load is a load for which application and cutting off are controlled by the electronic control unit 5, the process advances to step S305 and a determination is made as to whether or not a preparation for the load application has been made. As a result, when it is determined that the preparation for the application has been made, the process advances to step S306 and a determination is made as to whether or not the idle rotational speed is equal to or greater than a speed that permits load application. When the idle rotational speed is determined to be equal to or greater than the speed that permits load application, the process advances to step S307, a flag that permits load application is set, the load application/cutoff control means 508 of the electronic control unit permits a load to be applied, and the routine is ended.

When it is determined in step S306 of the routine of FIG. 17 that the idle rotational speed is not equal to or greater than the speed that permits load application, the process advances to step S308 and the correction amount of the ISC valve opening degree accompanying the load increase is calculated using an ISC correction amount calculation map I, after which this routine is ended and the process advances to step S203 of the routine of FIG. 16. The map I used in step S308 gives the relationship among the rotational speed N of the engine, the increase amount ΔR in the load of the generator, and the correction amount (increase amount) Δθisc of the opening degree of the ISC valve.

When it is determined in step S304 of the routine of FIG. 17 that the increased load is not a load for which application and cutting off are controlled by the electronic control unit, the process advances to step S309 and the correction amount Δθisc of the ISC valve opening degree accompanying the load increase is calculated using an ISC correction amount calculation map II. The map II gives the relationship among the rotational speed N of the engine, the increase amount ΔR in the load of the generator, and the correction amount Δθisc, and is created with characteristics different from the map used in step S308.

When it is determined in step S303 of the routine of FIG. 17 that the value measured by the correction time measurement counter is equal to or greater than the set correction time, the process advances to step S310 and the correction time (the time during which the target opening degree of the ISC valve is corrected) is brought to 0. Next, the correction amount of the target opening degree of the ISC valve is brought to 0 in step S311, this routine is ended, and the process transitions to step S203 of the routine of FIG. 16.

After the routine of FIG. 17 is executed and the correction amount Δθisc of the target opening degree of the ISC valve is calculated in step S204 of FIG. 16, the corrected target opening degree θisc=θiscf+Δθisc is calculated in step S203 of the routine of FIG. 16, and an ISC valve operation signal is sent to the valve operation means 505 so as to bring the opening degree of the ISC valve 7 to the corrected target opening degree θisc in step S03 of FIG. 14.

According to the algorithms shown in FIGS. 14 to 17, the load fluctuation detection means 506 is configured by the load application amount detection routine of FIG. 15, and the correction amount calculation means 513 is configured by the routine for calculating the correction amount for the opening degree of the ISC valve as shown in FIG. 17. The means 514 for calculating the corrected target opening degree is configured by step S203 of the routine for calculating the opening degree of the ISC valve as in FIG. 16.

Various embodiments of the present invention were described above, but below is a summary of the invention disclosed in the present description and drawings.

(1) First Invention

The present invention is intended to provide an engine drive system provided with: an engine 1 having an ISC valve 7 that bypasses a throttle valve; a magneto AC generator 2 driven by the engine 1; a regulator 4 provided between an output end of the generator 2 and a pair of output terminals 3 to which a load of the generator is connected, the regulator 4 adjusting a voltage and rectifying an AC output of the generator; and an electronic control unit 5 in which at least the engine is a control object.

The regulator 4 used in the system according to the present invention is an open-type regulator configured such that when a voltage between the output terminals 3 to which an electrical load of the generator 2 is connected is equal to or less than a set value, the regulator rectifies an induced voltage of an armature coil of the generator and outputs this voltage through the output terminals, and when the voltage between the output terminals 3 exceeds the set value, the regulator electrically disconnects the armature coil from the output terminals, thereby preventing the voltage between the output terminals from exceeding the set value.

The electronic control unit 5 used in the system according to the present invention is provided with: a valve operation means 505 that operates the ISC valve so that an opening degree of the ISC valve is brought to a set target opening degree; a load fluctuation detection means 506 that detects a load fluctuation of the generator 2 occurring while the engine is idling; and a target opening degree setting means 507 configured so that when the load fluctuation detection means 506 has not detected a load fluctuation, an idle-control target opening degree is given as the target opening degree of the ISC valve to the valve operation means 505, the idle-control target opening degree being the target opening degree of the ISC valve during feedback control that is performed so as to maintain an idle rotational speed at a target value, and when the load fluctuation detection means 506 has detected a load fluctuation, a corrected target opening degree is given as the target opening degree of the ISC valve to the valve operation means for a limited amount of time, after which the target opening degree given to the valve operation means is returned to the idle-control target opening degree, the corrected target opening degree being the idle-control target opening degree that is corrected by a correction amount designed to minimize a fluctuation in the idle rotational speed occurring due to the load fluctuation.

In cases in which an open-type regulator is used as the regulator 4 that adjusts the output of the generator 2 driven by the engine 1, when the engine 1 is idling while the generator is in a no-load state, almost no mechanical load is applied to the engine 1 from the generator 2, and an output torque of the engine is low, Therefore, when an electrical load of the generator 2 is applied, the rotational speed of the engine dramatically decreases, and in worst cases the engine sometimes stalls. Additionally, when the load of the generator 2 is cut off during idling, the idle rotational speed dramatically increases. However, fluctuation does not immediately occur in the idle rotational speed of the engine when the load of the generator 2 fluctuates; after the load of the generator fluctuates there is inevitably a delay until the idle rotational speed begins to fluctuate.

In the present invention, the system is configured such that when a fluctuation in the electrical load of the generator 2 is detected while the engine 1 is idling, a corrected target opening degree is given as the target opening degree of the ISC valve to the valve operation means 505 for a limited amount of time, after which the target opening degree given to the valve operation means is returned to the idle-control target opening degree, the corrected target opening degree being the idle-control target opening degree corrected by a correction amount designed to minimize a fluctuation in the idle rotational speed occurring due to the load fluctuation. When the system is thus configured, the opening degree of the ISC valve can be corrected before the idle rotational speed begins to decrease, or at least before the idle rotational speed dramatically decreases, and the output torque of the engine can be adjusted so as to minimize the fluctuation in the idle rotational speed, making it possible to prevent a fluctuation width of the idle rotational speed from becoming significant and the engine from stalling while idling.

(2) Second Invention

A second invention relates to the configuration of the target opening degree setting means 507 used in the first invention. The target opening degree setting means 507 used in the present invention is configured so that when the load fluctuation of the generator has been detected, a corrected target opening degree is given as the target opening degree to the valve operation means 505 for a set amount of time, after which the target opening degree sent to the valve operation means is returned to the idle-control target opening degree.

(3) Third Invention

A third invention also relates to the configuration of the target opening degree setting means used in the first invention. The target opening degree setting means 507 used in the present invention is configured so that when the load fluctuation has been detected, the corrected target opening degree is given as the target opening degree to the valve operation means, after which the target opening degree given to the valve operation means is returned to the idle-control target opening degree when a state is established indicating that the idle rotational speed has converged on the target value.

(4) Fourth Invention

A fourth invention relates to the configuration of the target opening degree setting means 507 used when the configuration of the invention of any of the first through third inventions is adopted. The target opening degree setting means 507 used in the present invention is provided with a means 512 for calculating the idle-control target opening degree, and a correction amount calculation means 513 that calculates the correction amount in accordance with the extent of the load fluctuation when the load fluctuation has been detected, the target opening degree setting means 507 being configured so that the correction amount calculated by the correction amount calculation means 513 is used and a corrective calculation is performed on the idle-control target opening degree calculated by the means 512 for calculating the idle-control target opening degree, whereby the corrected target opening degree is calculated.

(5) Fifth Invention

A fifth invention also relates to the configuration of the target opening degree setting means 507 used when the configuration of the invention of any of the first through third inventions is adopted. The present invention is configured such that when a load fluctuation of the generator 2 has been detected, a target idle rotational speed during feedback control of the idle rotational speed is corrected, whereby the opening degree of the ISC valve is corrected in order to minimize fluctuation in the idle rotational speed. Specifically, the target opening degree setting means 507 used in the present invention is provided with: a means 512 for calculating the idle-control target opening degree in which the target value and a detected value of the idle rotational speed are used as input and in which the idle-control target opening degree needed to maintain the idle rotational speed at the target value is calculated; and a means 515 for calculating a correction amount for the target rotational speed whereby the correction amount is calculated for the target value of the idle rotational speed needed to cause the means 512 for calculating the idle-control target opening degree to calculate the corrected target opening degree when a load fluctuation has been detected; the target opening degree setting means 507 being configured so that, when the load fluctuation has been detected, the target rotational speed sent to the means 512 for calculating the idle-control target opening degree is corrected by the correction amount calculated by the means 515 for calculating the correction amount for the target rotational speed, whereby the means 512 for calculating the idle-control target opening degree is caused to calculate the corrected target opening degree.

(6) Sixth Invention

A sixth invention relates to the configurations of the electronic control unit 5 and the load fluctuation detection means 506 used when the configuration of the invention of any of the first through fifth inventions is adopted. The electronic control unit used in the present invention is further provided with a load application/cutoff control means 508 whereby at least one of loads of the generator 2 sometimes connected to the output terminals 3 while the engine is idling is designated as a controlled load, and controls application and cutting off of the controlled load. In this case, the load fluctuation detection means 506 is configured so as to acquire, from the load application/cutoff control means 508, information that a load will be applied and information that the load will be cut off, and to detect a fluctuation in the load.

When the system is configured as described above, it is possible to know that the idle rotational speed fluctuates due to a connection of a controlled load before the idle rotational speed actually begins to fluctuate. Therefore, it is possible to quickly devise a measure (correcting the opening degree of the ISC valve) for minimizing the fluctuation in the idle rotational speed when the electrical load of the generator has fluctuated during idling, and to reliably minimize the fluctuation in the idle rotational speed occurring due to the electrical load being applied or cut off.

(7) Seventh Invention

A seventh invention relates to the configurations of the target opening degree setting means 507 and the load application/cutoff control means 508 used when the configuration of the sixth invention is adopted. The target opening degree setting means 507 used in the present invention is configured so that when the load fluctuation detection means 506 acquires, from the load application/cutoff control means 508, information that a load will be applied and detects a load fluctuation, the target opening degree given to the valve operation means 505 is increased above the idle-control target opening degree by a correction amount that is set in accordance with a magnitude of the applied load. The load application/cutoff control means 508 is configured so that after the information that the load will be applied has been sent to the load fluctuation detection means 506, the load is applied when a confirmation is made that the idle rotational speed has increased to a set rotational speed that permits load application, the idle rotational speed being increased by increasing the target opening degree given to the valve operation means 505.

When the system is configured as described above, the opening degree of the ISC valve is immediately increased when information that a load of the generator will be applied during idling is obtained, and an electrical load is then connected pending an increase in the idle rotational speed to a speed that permits load connection. Therefore, it is possible to reliably prevent the idle rotational speed from dramatically decreasing when an electrical load is connected, and to reliably prevent the engine from stalling when an electrical load is connected.

(8) Eighth Invention

An eighth invention relates to the configurations of the target opening degree setting means 507 and the load application/cutoff control means 508 used when the configuration of the sixth or seventh invention is adopted. The target opening degree setting means 507 used in the present invention is configured so that when the load fluctuation detection means 506 acquires, from the load application/cutoff control means 508, information that the load will be cut off and detects a load fluctuation, the target opening degree given to the valve operation means is reduced below the idle-control target opening degree by a correction amount set in accordance with a magnitude of the cut-off load. The load application/cutoff control means 508 is configured so that after the information that the load of the generator will be cut off has been sent to the load fluctuation detection means 506, the load is cut off when a confirmation is made that the idle rotational speed has decreased to a set rotational speed that permits the load to be cut off, the idle rotational speed being decreased by the reducing the target opening degree sent to the valve operation means 505.

When the system is configured as described above, the opening degree of the ISC valve is immediately reduced when information that the load of the generator will be cut off during idling is obtained, after which an electrical load is cut off pending a decrease in the idle rotational speed to a speed that permits load connection. Therefore, it is possible to reliably prevent the idle rotational speed from dramatically increasing when an electrical load is cut off.

(9) Ninth Invention

A ninth invention is an engine drive system in which a battery is connected between output terminals to which a load of a generator is connected, wherein configurations are indicated that can be adopted by the load fluctuation detection means 506 and the target opening degree setting means 507 used when the configurations of the first through sixth inventions are adopted. In the present invention, the load fluctuation detection means 506 is configured so as to detect the load fluctuation of the generator when a change in voltage between the output terminals 3 has been detected, and the target opening degree setting means 507 is configured so as to determine the correction amount for the target opening degree of the ISC valve 7 in accordance with an extent of the change in voltage between the output terminals when the load fluctuation has been detected.

When an electrical load is connected between the output terminals 3 during idling in a case in which a battery 6 is connected between the output terminals 3, a battery voltage first decreases due to a current flowing from the battery to the electrical load, a charging current then flows from an armature coil of the generator through a regulator to the battery when the battery voltage decreases to a charging initiation voltage, and a mechanical load applied from the generator to the engine begins to increase. Thus, when a battery is connected between the output terminals, a delay occurs to some degree until the load applied from the generator to the engine increases after an electrical load is connected. Therefore, this decrease in the battery voltage is accurately detected, whereby the load applied from the generator to the engine increases due to the connection of the electrical load before the idle rotational speed begins to decrease, the decrease in the idle rotational speed is detected early, the opening degree of the ISC valve can be increased, and the decrease in the idle rotational speed can be minimized.

(10) Tenth Invention

A tenth invention indicates a preferred configuration of the load fluctuation detection means used when the configuration of any of the first through sixth inventions is adopted. In the present invention, the target opening degree setting means 507 is configured so that when a load fluctuation of the generator 2 is detected, the correction amount for the target opening degree of the ISC valve is determined in accordance with an extent of a change in voltage between the output terminals to which the load of the generator is connected.

(11) Eleventh Invention

An eleventh invention indicates a configuration that can be adopted when the configuration of the ninth or tenth invention is adopted. The present invention is provided with a sampling means that samples the voltage between the output terminals 3 at a set sampling cycle. The target opening degree setting means 507 in this case is configured so that when a voltage newly sampled by the sampling means has decreased by at least a set value below a voltage sampled in a previous cycle, the target opening degree sent to the valve operation means is increased above the idle-control target opening degree, the target opening degree being increased by a correction amount that is set in accordance with an amount of the voltage decrease.

(12) Twelfth Invention

A twelfth invention indicates a configuration that can be adopted when the configuration of the ninth or tenth invention is adopted. The present invention is also provided with a sampling means that samples the voltage between the output terminals at a set sampling cycle, and the target opening degree setting means 507 is configured so that when a voltage newly sampled by the sampling means has increased by at least a set value above a voltage sampled in a previous cycle, the target opening degree sent to the valve operation means 505 is reduced below the idle-control target opening degree, the target opening degree being reduced by a correction amount that is set in accordance with an amount of the voltage increase.

(13) Thirteenth Invention

A thirteenth invention indicates yet another configuration that can be adopted by the load fluctuation detection means 506 used when the configurations of the first through fifth inventions are adopted. The present invention is provided with a load application/cutoff detection means 508 that detects an application and cutoff of a load of the generator; and the load fluctuation detection means 506 is configured so as to detect a load fluctuation of the generator when information is acquired from the load application/cutoff detection means 508 that a load will be applied and when information is acquired from the load application/cutoff detection means 508 that a load will be cut off. The application and cutoff of the load of the generator can be detected by providing load-applying switches with sensors that detect whether the load-applying switches are in an ON or OFF state, the load-applying switches being provided between the output terminals and the loads.

INDUSTRIAL APPLICABILITY

The present invention is an engine drive system that uses a magneto AC generator as a generator driven by an engine, wherein an open-type regulator can be used as a regulator that rectifies an output of the generator and adjusts an output voltage without destabilizing idling of the engine or inducing circumstances in which the engine would stall. When an open-type regulator is used, the fuel consumption of the engine can be improved in comparison with when a short-circuit-type regulator is used. The present invention is therefore widely applicable in a variety of industrial fields in which a magneto AC generator is used as a generator driven by an engine, such as engine generators and engine-driven vehicles and agricultural machinery.

EXPLANATION OF NUMERALS AND CHARACTERS

1 Engine
2 Magneto AC generator
3 Output terminal
4 Regulator
5 Electronic control unit
501 Ignition circuit
502 Injector drive circuit
503 Ignition control means
504 Fuel injection control means
505 Valve operation means
506 Load fluctuation detection means
507 Target opening degree setting means
508 Load application/cutoff control means
509 Output voltage detection means
510 Rotational speed detection means
511 Target rotational speed setting means
512 Means for calculating idle-control target opening degree
513 Correction amount calculation means
514 Means for calculating corrected target opening degree
515 Means for calculating correction amount for target rotational speed
516 Target rotational speed correction means
6 Battery
7 ISC valve

The invention claimed is:

1. An engine drive system provided with: an engine having an ISC valve that bypasses a throttle valve; a magneto AC generator driven by the engine; a regulator provided between an output end of the generator and a pair of output terminals to which a load of the generator is connected, the regulator adjusting a voltage and rectifying an AC output of the generator; and an electrical control unit in which at least the engine is a control object; wherein the regulator comprises an open-type regulator configured such that when a voltage between the output terminals is equal to or less than a set value, the regulator rectifies the AC output of the generator and outputs the output through the output terminals, and when the voltage between the output terminals exceeds the set value, the regulator electrically disconnects the output terminals and the output end of the generator, thereby preventing a voltage that exceeds the set value from being applied to the output terminals; and wherein the electrical control unit includes:
a valve operation means that operates the ISC valve so that an opening degree of the ISC valve is brought to a given target opening degree;
a load fluctuation detection means that detects a load fluctuation of the generator occurring while the engine is idling; and
a target opening degree setting means configured so as to give the target opening degree of the ISC valve to the valve operation means so that when the load fluctuation detection means has not detected a load fluctuation, an idle-control target opening degree is given as the target opening degree of the ISC valve to the valve operation means, the idle-control target opening degree being the target opening degree of the ISC valve during feedback control is performed so as to maintain an idle rotational speed at a target value, and when the load fluctuation detection means has detected a load fluctuation, a corrected target opening degree is given as the target opening degree of the ISC valve to the valve operation means for a limited amount of time, after which the target opening degree given to the valve operation means is returned to the idle-control target opening degree, the corrected target opening degree being an idle-control target opening degree that is corrected by a correction amount designated to minimize a fluctuation in the idle rotational speed occurring due to the load fluctuation.

2. The engine drive system of claim 1, wherein the target opening degree setting means is configured so that the corrected target opening degree is given as the target opening degree to the valve operation means when the load fluctuation has been detected, and the target opening degree given to the valve operation means is then returned to the idle-control target opening degree when a set amount of time has elapsed.

3. The engine drive system of claim 1, wherein the target opening degree setting means is configured so that the corrected target opening degree is given as the target opening degree to the valve operation means when the load fluctuation has been detected, and the target opening degree given to the valve operation means is then returned to the idle-control target opening degree when a state is established indicating that the idle rotational speed has converged on the target value.

4. The engine drive system of claim 1, wherein the target opening degree setting means is provided with a means for calculating the idle-control target opening degree and a correction amount calculation means that calculates the correction amount in accordance with an extent of the load fluctuation when the load fluctuation has been detected, the target opening degree setting means being configured so that the correction amount calculated by the correction amount calculation means is used and a corrective calculation is performed on the idle-control target opening degree calculated by the means for calculating the idle-control target opening degree, whereby the corrected target opening degree is calculated.

5. The engine drive system of claim 1, wherein the target opening degree setting means is provided with: a means for calculating the idle-control target opening degree in which the target value and a detected value of the idle rotational speed are used as inputs and in which the idle-control target opening degree needed to maintain the idle rotational speed at the target value is calculated; and a means for calculating a correction amount for the target rotational speed whereby the correction amount is calculated for the target value of the idle rotational speed needed to cause the means for calculating the idle-control target opening degree to calculate the corrected target opening degree when the load fluctuation has been detected; the target opening degree setting means being configured so that when the load fluctuation has been detected, the target rotational speed given to the means for calculating the idle-control target opening degree is corrected by the correction amount calculated by the means for calculating the correction amount for the target rotational speed, whereby the means for calculating the idle-control target opening degree is caused to calculate the corrected target opening degree.

6. The engine drive system of claim 1, wherein:
the electronic control unit is further provided with a load application/cutoff control means that controls application and cutting off of a controlled load, the controlled load being at least one of loads of the generator that is sometimes connected to the output terminals while the engine is idling; and
the load fluctuation detection means is configured so as to acquire, from the load application/cutoff control means, information that a load will be applied and information that the load will be cut off, and to detect a fluctuation in the load.

7. The engine drive system of claim 6, wherein:
the target opening degree setting means is configured so that when the load fluctuation detection means acquires, from the load application/cutoff control means, information that a load will be applied and detects a load fluctuation, the target opening degree given to the valve operation means is increased above the idle-control target opening degree by a correction amount that is set in accordance with a magnitude of the applied load; and
the load application/cutoff control means is configured so that after the information that the load will be applied has been sent to the load fluctuation detection means, the load is applied when a confirmation is made that the idle rotational speed has increased to a set rotational speed that permits load application, the rotational speed being increased by increasing the target opening degree given to the valve operation means.

8. The engine drive system of claim 6, wherein:
the target opening degree setting means is configured so that when the load fluctuation detection means acquires, from the load application/cutoff control means, information that the load will be cut off and detects a load fluctuation, the target opening degree given to the valve operation means is reduced below the idle-control target opening degree by a correction amount that is set in accordance with a magnitude of the load to be cut off; and
the load application/cutoff control means is configured so that after the information that the load will be cut off has been sent to the load fluctuation detection means, the load is cut off when a confirmation is made that the idle rotational speed has decreased to a set rotational speed that permits the load to be cut off, the idle rotational speed being decreased by reducing the target opening degree given to the valve operation means.

9. The engine drive system of claim 7, wherein:
the target opening degree setting means is configured so that when the load fluctuation detection means acquires, from the load application/cutoff control means, information that the load will be cut off and detects a load fluctuation, the target opening degree given to the valve operation means is reduced below the idle-control target opening degree by a correction amount that is set in accordance with a magnitude of the load to be cut off; and
the load application/cutoff control means is configured so that after the information that the load will be cut off has been sent to the load fluctuation detection means, the load is cut off when a confirmation is made that the idle rotational speed has decreased to a set rotational speed that permits the load to be cut off, the idle rotational speed being decreased by reducing the target opening degree given to the valve operation means.

10. The engine drive system of claim 1, wherein:
a battery is connected between the output terminals;
the load fluctuation detection means is configured so as to detect the load fluctuation when a change in voltage between the output terminals has been detected; and
the target opening degree setting means is configured so as to determine the correction amount in accordance with an extent of the change in voltage between the output terminals when the load fluctuation has been detected.

11. The engine drive system of claim 6, wherein:
a battery is connected between the output terminals; and
the load fluctuation detection means is configured so as to detect the load fluctuation also when a change in voltage between the output terminals has been detected.

12. The engine drive system of claim 7, wherein:
a battery is connected between the output terminals; and
the load fluctuation detection means is configured so as to detect the load fluctuation also when a change in voltage between the output terminals has been detected.

13. The engine drive system of claim 10, wherein:
a sampling means that samples the voltage between the output terminals at a set sampling cycle is provided; and
the target opening degree setting means is configured so that when a voltage newly sampled by the sampling means has decreased by at least a set value below a voltage sampled in a previous cycle, the target opening degree given to the valve operation means is increased above the idle-control target opening degree, the target opening degree being increased by a correction amount that is set in accordance with an amount of the voltage decrease.

14. The engine drive system of claim 11 wherein:
a sampling means that samples the voltage between the output terminals at a set sampling cycle is provided; and
the target opening degree setting means is configured so that when a voltage newly sampled by the sampling means has decreased by at least a set value below a voltage sampled in a previous cycle, the target opening degree given to the valve operation means is increased above the idle-control target opening degree, the target opening degree being increased by a correction amount that is set in accordance with an amount of the voltage decrease.

15. The engine drive system of claim 10, wherein:
a sampling means that samples the voltage between the output terminals at a set sampling cycle is provided; and
the target opening degree setting means is configured so that when a voltage newly sampled by the sampling means has increased by at least a set value above a voltage sampled in a previous cycle, the target opening degree given to the valve operation means is reduced below the idle-control target opening degree, the target opening degree being reduced by a correction amount that is set in accordance with an amount of the voltage increase.

16. The engine drive system of claim 11, wherein:
a sampling means that samples the voltage between the output terminals at a set sampling cycle is provided; and the target opening degree setting means is configured so that when a voltage newly sampled by the sampling means has increased by at least a set value above a voltage sampled in a previous cycle, the target opening degree given to the valve operation means is reduced below the idle-control target opening degree, the target opening degree being reduced by a correction amount that is set in accordance with an amount of the voltage increase.

17. The engine drive system of claim 1, wherein a load application/cutoff detection means that detects an application and cutoff of a load connected to the output terminals is provided; and the load fluctuation detection means is configured so as to detect a load fluctuation of the generator when information is acquired from the load application/cutoff detection means that a load will be applied and when information is acquired from the load application/cutoff detection means that a load will be cut off.

18. The engine drive system of claim 2, wherein a load application/cutoff detection means that detects an application and cutoff of a load connected to the output terminals is provided; and the load fluctuation detection means is configured so as to detect a load fluctuation of the generator when information is acquired from the load application/cutoff detection means that a load will be applied and when information is acquired from the load application/cutoff detection means that a load will be cut off.

19. The engine drive system of claim 3, wherein a load application/cutoff detection means that detects an application and cutoff of a load connected to the output terminals is provided; and the load fluctuation detection means is configured so as to detect a load fluctuation of the generator when information is acquired from the load application/cutoff detection means that a load will be applied and when information is acquired from the load application/cutoff detection means that a load will be cut off.

20. The engine drive system of claim 4, wherein a load application/cutoff detection means that detects an application and cutoff of a load connected to the output terminals is provided; and the load fluctuation detection means is configured so as to detect a load fluctuation of the generator when information is acquired from the load application/cutoff detection means that a load will be applied and when information is acquired from the load application/cutoff detection means that a load will be cut off.

* * * * *

UNITED STATES PATENT AND TRADEMARK OFFICE
CERTIFICATE OF CORRECTION

PATENT NO. : 10,895,210 B1
APPLICATION NO. : 16/467585
DATED : January 19, 2021
INVENTOR(S) : Kei Hiramatsu Page 1 of 1

It is certified that error appears in the above-identified patent and that said Letters Patent is hereby corrected as shown below:

In the Specification

Column 20, Line 64, "idling at time to and when the" should read --idling at time ta and when the--

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*